(12) United States Patent
Nakaharai et al.

(10) Patent No.: US 12,228,347 B2
(45) Date of Patent: Feb. 18, 2025

(54) HEAT EXCHANGER CORE AND HEAT EXCHANGER

(71) Applicant: MITSUBISHI HEAVY INDUSTRIES, LTD., Tokyo (JP)

(72) Inventors: Hiroyuki Nakaharai, Tokyo (JP); Nobuhide Hara, Tokyo (JP); Yoichi Uefuji, Tokyo (JP); Koichi Tanimoto, Tokyo (JP); Masaya Hatanaka, Tokyo (JP); Shunsaku Eguchi, Tokyo (JP); Takuo Oda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 201 days.

(21) Appl. No.: 17/798,202

(22) PCT Filed: Feb. 24, 2021

(86) PCT No.: PCT/JP2021/006767
§ 371 (c)(1),
(2) Date: Aug. 8, 2022

(87) PCT Pub. No.: WO2021/172320
PCT Pub. Date: Sep. 2, 2021

(65) Prior Publication Data
US 2023/0092417 A1    Mar. 23, 2023

(30) Foreign Application Priority Data

Feb. 27, 2020   (JP) ................................ 2020-031381
Feb. 27, 2020   (JP) ................................ 2020-031402

(51) Int. Cl.
*F28F 9/02*        (2006.01)
*B21D 53/06*       (2006.01)
(Continued)

(52) U.S. Cl.
CPC ........... *F28D 7/1669* (2013.01); *B21D 53/06* (2013.01); *F28D 7/10* (2013.01)

(58) Field of Classification Search
CPC .......... F28D 7/1669; F28D 7/10; B21D 53/06
(Continued)

(56) References Cited

U.S. PATENT DOCUMENTS

| | | | |
|---|---|---|---|
| 2,499,384 A * | 3/1950 | Holm ......................... | F25J 5/00 |
| | | | 62/640 |
| 3,118,498 A * | 1/1964 | Bergdoll ................... | F28F 1/02 |
| | | | 165/173 |
| 2019/0120562 A1 | 4/2019 | Fuller | |

FOREIGN PATENT DOCUMENTS

| | | | | |
|---|---|---|---|---|
| CN | 105637314 A * | 6/2016 | ............. | B64D 33/10 |
| GB | 2360085 A * | 9/2001 | ........... | F28D 9/0012 |

(Continued)

OTHER PUBLICATIONS

International Search Report, issued in PCT/JP2021/006767, PCT/ISA/210, dated Apr. 27, 2021.
(Continued)

*Primary Examiner* — Davis D Hwu
(74) *Attorney, Agent, or Firm* — BIRCH, STEWART, KOLASCH & BIRCH, LLP

(57) ABSTRACT

In a header of a heat exchanger core, a header passage includes: at least one radial passage extending along a radial direction, and a plurality of circumferential passages branched from each radial passage and communicating with one or more of the axial passages, respectively. The flow passage area of each radial passage is smaller in a second position than in a first position, where the second position is inward of the first position in the radial direction.

7 Claims, 18 Drawing Sheets

(51) Int. Cl.
*F28D 7/10* (2006.01)
*F28D 7/16* (2006.01)

(58) Field of Classification Search
USPC .......................................... 165/158
See application file for complete search history.

(56) References Cited

FOREIGN PATENT DOCUMENTS

| | | | |
|---|---|---|---|
| JP | H0599585 A | * | 4/1993 |
| JP | 2018-519490 A | | 7/2018 |
| JP | 2021-38894 A | | 3/2021 |

OTHER PUBLICATIONS

Written Opinion of the International Searching Authority, issued in PCT/JP2021/006767, PCT/ISA/237, dated Apr. 27, 2021.

* cited by examiner

IIIa — IIIa

V-V

HEAT EXCHANGER CORE AND HEAT EXCHANGER

TECHNICAL FIELD

The present disclosure relates to a heat exchanger core and a heat exchanger.

The present application claims priority on Japanese Patent Application No. 2020-031381 and Japanese Patent Application No. 2020-031402 filed Feb. 27, 2020, the entire content of which is incorporated herein by reference.

BACKGROUND

For example, a cylindrical heat exchanger in which a group of flow passages is formed inside a cylindrical casing is known. Generally, the cylindrical heat exchanger is configured such that, in order to exchange heat between a first fluid and a second fluid, one of the first fluid or the second fluid flows in and out through axial end portions of the cylindrical casing, and the other fluid flows in and out through side portions of the casing along the radial direction (see Patent Document 1, for example).

CITATION LIST

Patent Literature

Patent Document 1: JP2018-519490A (translation of a PCT application)

SUMMARY

Problems to be Solved

In the cylindrical heat exchanger as described above, the flow of the fluid flowing into the casing along the radial direction is turned to the axial direction, and the flow of the fluid flowing in the casing along the axial direction is turned to the radial direction. Therefore, the flow rate of the fluid flowing in the casing may vary with the position in the circumferential direction or the radial direction, and the heat exchange efficiency may decrease due to such a difference in the flow rate. In order to suppress such a difference in the flow rate, it is desirable to ensure a space for turning the direction of the fluid flow. Therefore, it is difficult to downsize the cylindrical heat exchanger while ensuring a relatively high heat exchange efficiency.

In view of the above, an object of at least one embodiment of the present disclosure is to provide a heat exchanger core that can be downsized while ensuring a relatively high heat exchange efficiency.

Solution to the Problems (1) A heat exchanger core according to at least one embodiment of the present disclosure is provided with: a core body including a plurality of axial passages extending along the axial direction; and a header adjacent to at least one end portion of the core body in the axial direction and having a header passage communicating with the plurality of axial passages. The header passage includes: at least one radial passage extending along the radial direction, and a plurality of circumferential passages branched from each radial passage and communicating with one or more of the axial passages, respectively. A flow passage area of each radial passage is smaller in a second position than in a first position, where the second position is inward of the first position in the radial direction.

(2) A heat exchanger core is provided with: a core body including a plurality of axial passages extending along the axial direction; and a header adjacent to at least one end portion of the core body in the axial direction and having a header passage communicating with the plurality of axial passages. The header passage includes: at least one radial passage extending along the radial direction, and a plurality of circumferential passages branched from any of the at least one radial passage and communicating with one or more of the axial passages, respectively. The plurality of circumferential passages includes a first circumferential passage, and a second circumferential passage disposed radially inward of the first circumferential passage and arranged in the circumferential direction over a total angular range larger than that of the first circumferential passage.

(3) A heat exchanger according to at least one embodiment of the present disclosure is provided with: the heat exchanger core having the configuration (1) or (2); and a casing accommodating the heat exchanger core.

Advantageous Effects

According to at least one embodiment of the present disclosure, it is possible to downsize a heat exchanger core while ensuring a relatively high heat exchange efficiency.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Schematic Configuration of Heat Exchanger)

Figure 1:
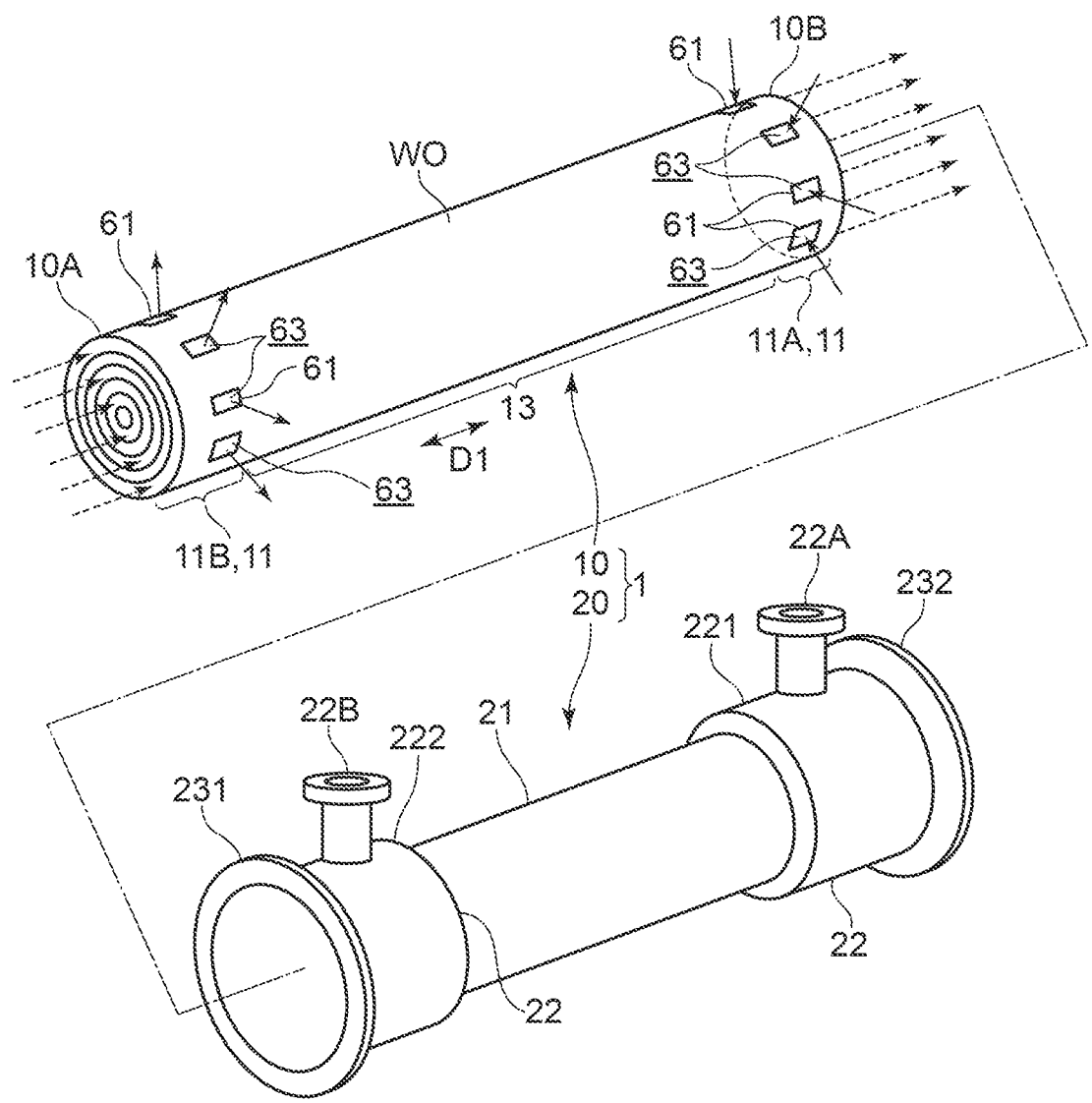
FIG. 1 is an exploded perspective view of a heat exchanger core and a casing of a heat exchanger according to some embodiments.
Figure 2:
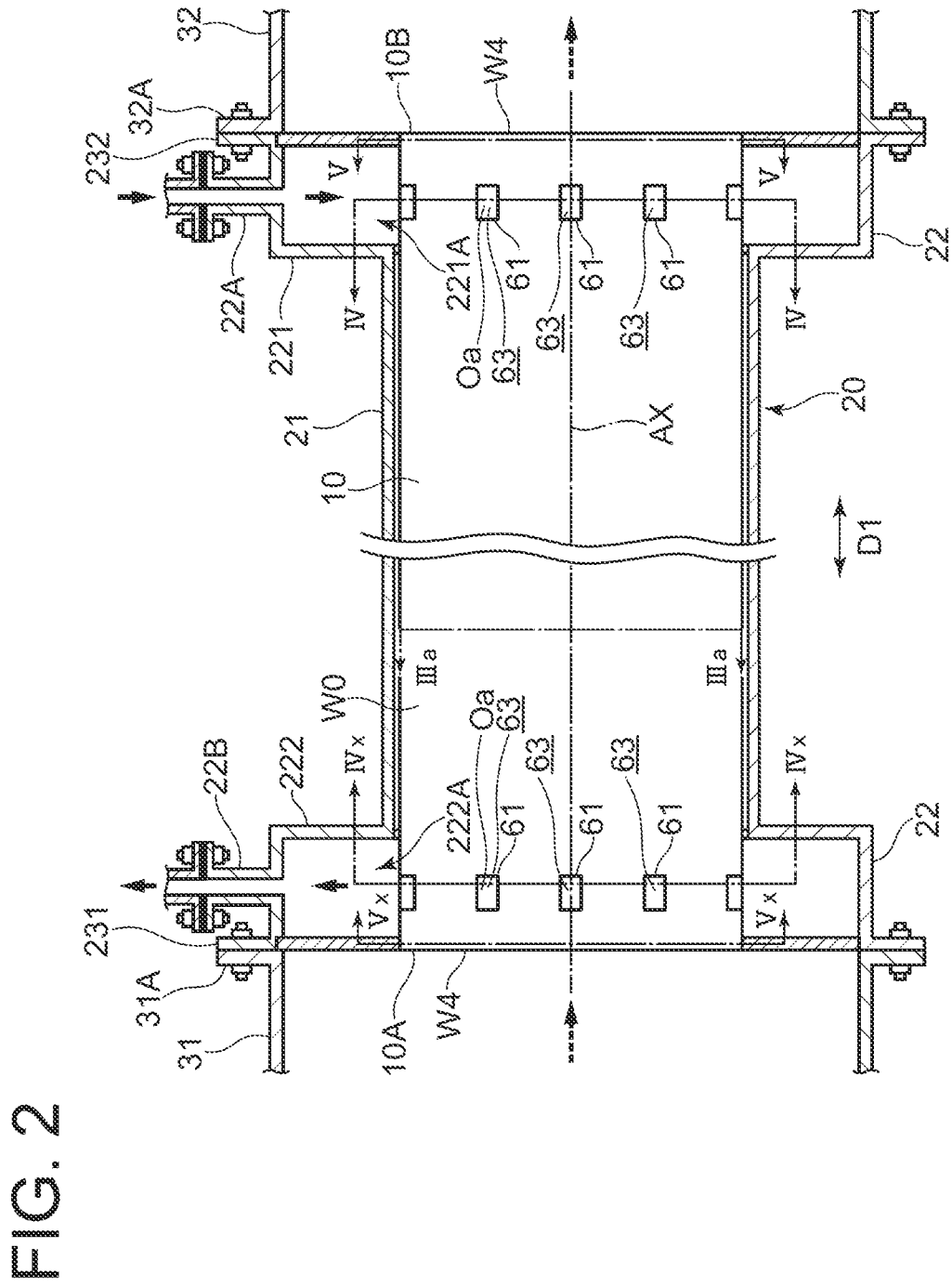
FIG. 2 is a partial cross-sectional view of the casing and the heat exchanger core accommodated in the casing of the heat exchanger shown in FIG. 1.

As shown in FIGS. 1 and 2, a heat exchanger 1 according to some embodiments includes a heat exchanger core 10 and a casing 20 accommodating the heat exchanger core 10.

The heat exchanger 1 according to some embodiments can be incorporated into, for example, a gas turbine, a chemical plant such as a $CO_2$ recovery device, or a device (not shown) such as an air conditioner or a freezer to exchange heat between a first fluid and a second fluid. For example, the temperature of the first fluid is relatively high, while the temperature of the second fluid is relatively low. To the contrary, the temperature of the first fluid may be relatively low, while the temperature of the second fluid may be relatively high.

(Configuration of Heat Exchanger Core)

The heat exchanger core 10 according to some embodiments includes a core body 13, and headers 11A and 11B adjacent to one and the other end portions of the core body 13 in the axial direction. For convenience of explanation, the header 11A adjacent to one end portion of the core body 13 in the axial direction is also referred to as a first header 11A, and the header 11B adjacent to the other end portion in the axial direction is also referred to as a second header 11B.

Figure 3A:
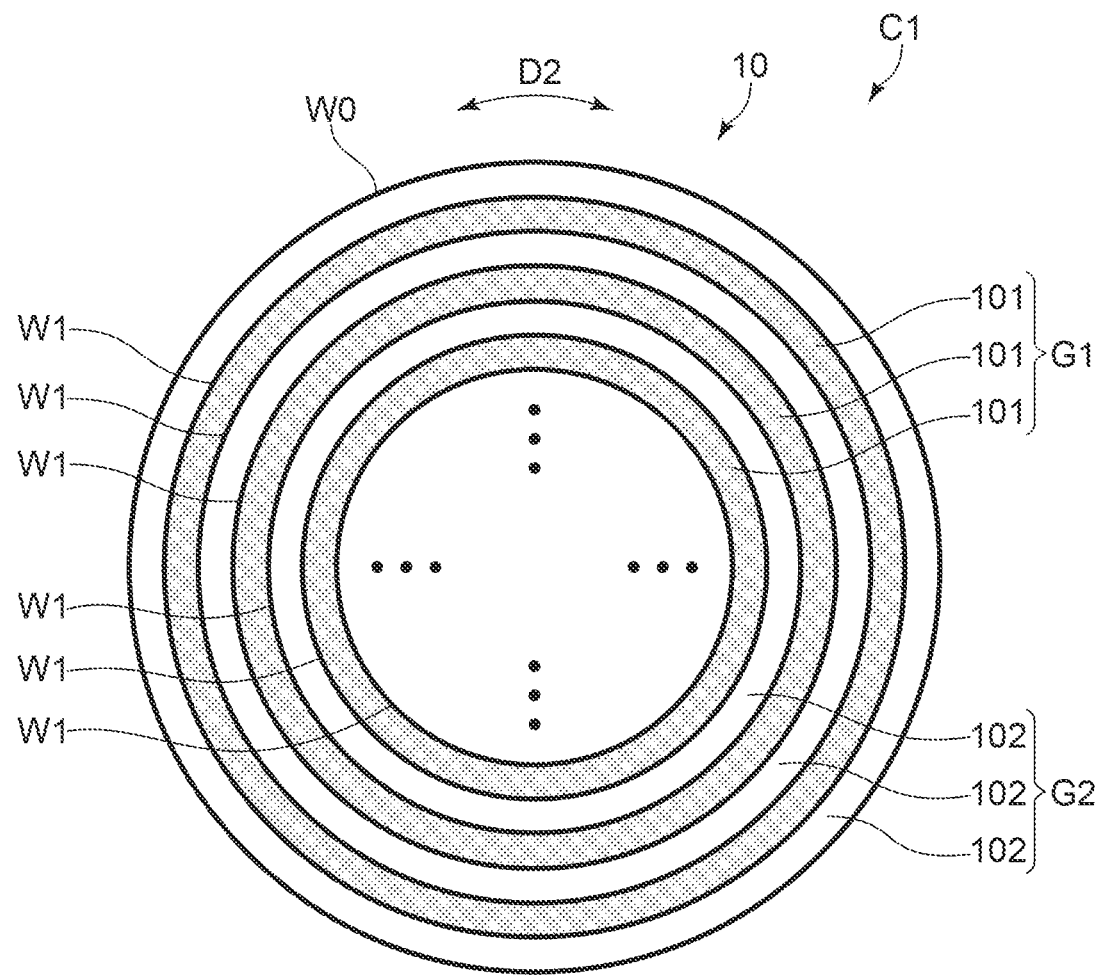
FIG. 3A is a cross-sectional view taken along line IIIa-IIIa of FIG. 2 (first transverse cross-section of heat exchanger core), showing a first passage group and a second passage group.

FIG. 3A is a cross-sectional view taken along line in FIG. 2. The core body 13 according to some embodiments includes a part of a plurality of first passages 101 and a plurality of second passages 102, which are a plurality of axial passages 3 extending along the axial direction, as will be described later.

Each of the headers 11A and 11B according to some embodiments has a header passage 6 communicating with the plurality of axial passages 3 (see FIG. 6), as will be described in detail later.

As shown in FIGS. 1 and 3A, the heat exchanger core 10 according to some embodiments includes a first passage group G1 and a second passage group G2 arranged concentrically as a whole.

Figure 4:
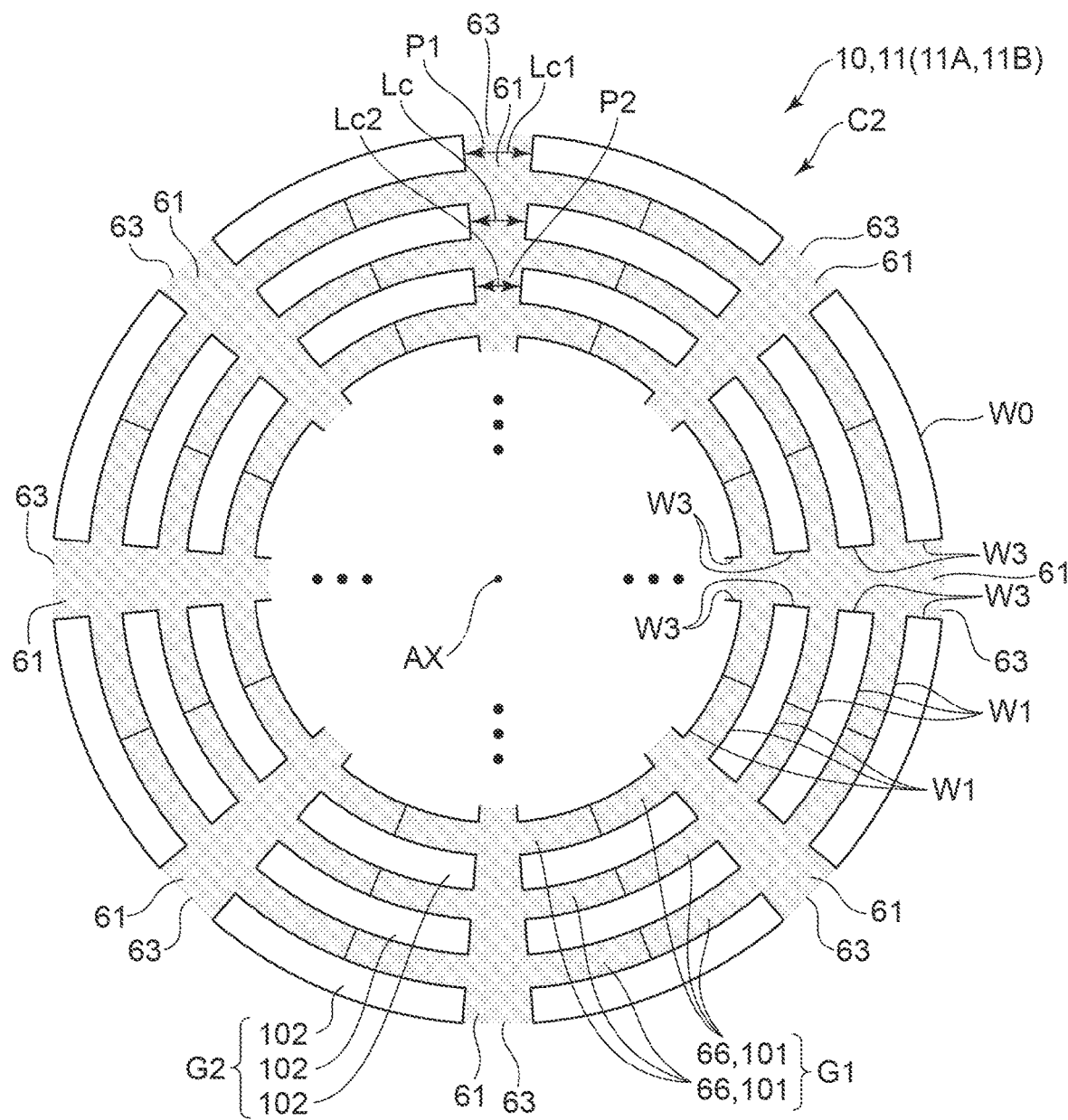
FIG. 4 is a cross-sectional view taken along line IV-IV in FIG. 2 (second transverse cross-section of heat exchanger core).
Figure 5:
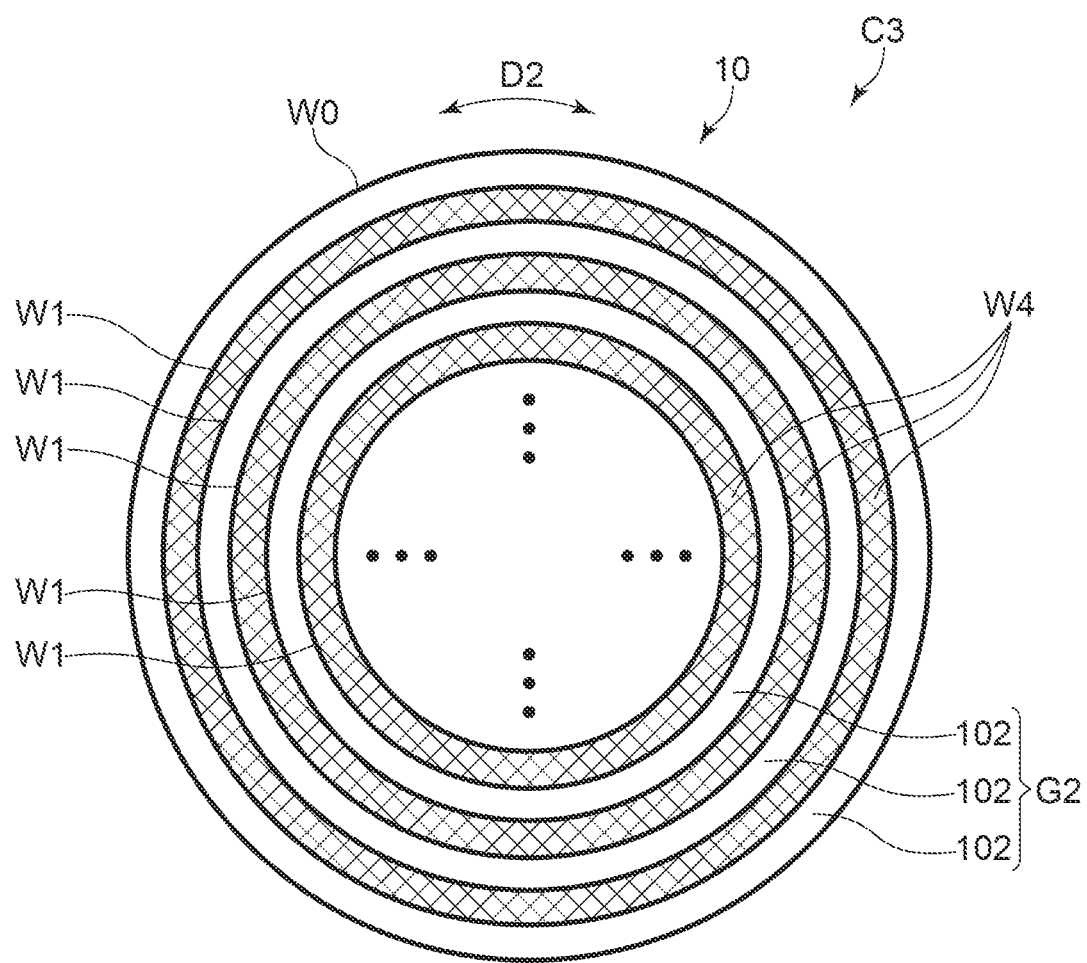
FIG. 5 is a cross-sectional view taken along line V-V in FIGS. 2 and 6 (third transverse cross-section of heat exchanger core).

The heat exchanger 1 according to some embodiments includes a first transverse cross-section C1 shown in FIG. 3A, a second transverse cross-section C2 shown in FIG. 4, and a third transverse cross-section C3 shown in FIG. 5. All the transverse cross-sections C1 to C3 have a circular shape. The overall outer shape of the heat exchanger core 10 is formed in a cylindrical shape. The heat exchanger core 10 has partition walls (first partition wall) W1 arranged concentrically and separating the first passage group G1 from the second passage group G2, and a side wall W0 arranged on the outermost periphery of the heat exchanger core 10.

The heat exchanger core 10 has not only an outer shape but also an overall shape that is symmetrical about the center of the transverse cross-sections C1 to C3, i.e., the central axis (axis AX) of the heat exchanger core 10 of a cylindrical shape. This shape contributes to, in addition to equalizing stress, equalizing the heat exchange efficiency.

In the heat exchanger 1 according to some embodiments, the first passage group G1 corresponds to the first fluid, and the second passage group G2 corresponds to the second fluid. In each figure, the first passage group G1 is filled with a shaded pattern.

The second passage group G2 according to some embodiments extends from one end portion 10A (FIG. 1) to the other end portion 10B (FIG. 1) of the heat exchanger core 10 in the axial direction D1. The axial direction D1 is perpendicular to the transverse cross-sections C1 to C3. That is, in some embodiments, the plurality of second passages 102 is included in the axial passage 3.

In each figure, the flow of the first fluid is shown by the solid arrow, and the flow of the second fluid is shown by the dashed arrow.

In some embodiments, the first passages 101 constituting the first passage group G1 are arranged in an annular shape in the first transverse cross-section C1 shown in FIG. 3A. The same applies to the second passages 102 constituting the second passage group G2. In some embodiments, the first fluid flowing through the first passage group G1 and the second fluid flowing through the second passage group G2 transfer heat by indirect contact through the first partition walls W1 shown by the bold line in FIG. 3A.

As shown in FIG. 3A, it is preferable that the plurality of first passages 101 and the plurality of second passages 102 are alternately layered in the radial direction of the heat exchanger core 10, for example, over several tens of layers.

The first passages 101 and the second passages 102 are preferably arranged over the entire radial range of the heat exchanger core 10, that is, to near the central axis of the heat exchanger core 10, i.e., near the axis AX. In FIGS. 3A, 3B, 4, and 5, only some first passages 101 and some second passages 102 are shown. The remaining first passages 101 and second passages 102 in the area indicated by " . . . " are omitted from the illustration.

As in the present embodiment, when the first passages 101 and the second passages 102 are arranged over the entire radial range of the heat exchanger core 10, the entire heat exchanger core 10 can contribute to heat exchange.

In some embodiments, the heat exchanger core 10 may have a constant cross-sectional shape corresponding to the first transverse cross-section C1 (FIG. 3A) over the range between line IV-IV and line IVx-IVx shown in FIG. 2. In the present embodiment, in this range, i.e., in the range from the vicinity of one end portion 10A of the heat exchanger core 10 to the vicinity of the other end portion 10B, the first fluid and the second fluid flow in opposite directions along the axial direction D1. In other words, the first fluid and the second fluid form a countercurrent flow (fully countercurrent) over substantially the entire axial direction D1 of the heat exchanger core 10 except at both end portions.

The first fluid and the second fluid may flow in the same direction along the axial direction D1. In this case, the first fluid and the second fluid form a parallel flow.

In the heat exchanger core 10 according to some embodiments, the dimensions in the axial direction D1 and the radial direction, the flow passage cross-sectional area, and the number of layers of the passages 101 and 102 are appropriately set in consideration of the required heat exchange capacity, stress, etc.

Figure 3B:
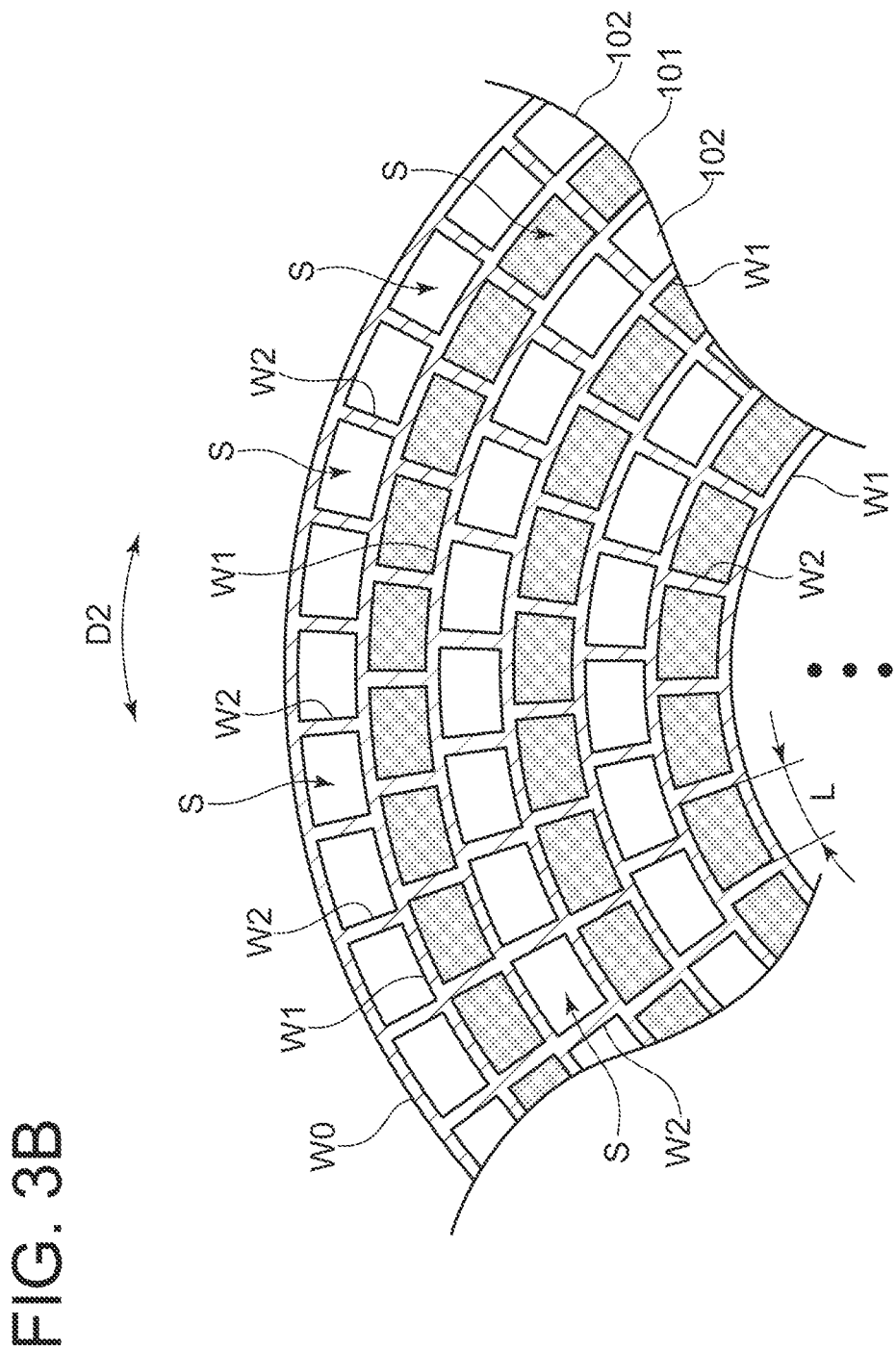
FIG. 3B is a partial enlarged view of FIG. 3A. In all but this figure, dividing walls (W2) are omitted.

As shown in FIG. 3B, it is preferable that the first passage 101 and the second passage 102 are each divided by dividing walls W2 into a plurality of sections S in the circumferential direction D2 of the heat exchanger core 10. With the installation of the dividing walls W2, it is possible to improve the stiffness and strength particularly in the radial direction against the pressure of the fluid.

Further, when the first passage 101 and the second passage 102 are each divided into sections S by the dividing walls W2, the surface area of the flow passage in contact with the fluid increases, so that the heat transfer efficiency can be improved.

The sections S are preferably arranged over the entire circumference of the heat exchanger core 10 with the same flow passage diameter. Further, all the sections S from the outermost periphery to the central axis of the heat exchanger core 10 preferably have the same flow passage diameter. In this case, the flow state such as friction loss is made uniform among all the sections S, so that the heat transfer coefficient is made uniform among all the sections S, and the stress acting on the heat exchanger core 10 is uniformly dispersed in the in-plane direction of the transverse cross-section of the heat exchanger core 10, thus equalizing the stress.

The "flow passage diameter" herein corresponds to the equivalent diameter D given by the following equation (1).

$$D=4A/L \quad (1)$$

A: Cross-sectional area of section S
L: Length (perimeter) of section S in circumferential direction D2

Since the heat transfer coefficient corresponds to the reciprocal of the flow passage diameter, an appropriate flow passage diameter is preferably given to the section S based on it.

The heat exchanger core 10 according to some embodiments may be integrally formed with the dividing walls W2 by additive manufacturing or the like using a metal material having characteristics suitable for a fluid, for example, stainless steel or aluminum alloy. With additive manufacturing, for example, an object with stacked two-dimensional structures can be obtained by repeatedly supplying metal powder to a forming area in the device, emitting laser beam or electron beam based on two-dimensional data showing a cross-section of a three-dimensional shape, melting the metal powder, and solidifying the metal powder.

In some embodiments, the thickness of the wall W1 or the like of the heat exchanger core 10 obtained by additive manufacturing using a metal material is, for example, 0.3 to 3 mm.

The heat exchanger core 10 according to some embodiments is produced through a step of forming the first passage group G1 and the second passage group G2 by additive manufacturing using a metal material. The object obtained through the forming step by additive manufacturing may be polished, for instance, if necessary. The method of producing the heat exchanger core 10 according to some embodiments will be described in detail later.

The heat exchanger core 10 according to some embodiments is not limited to additive manufacturing, but may be integrally formed by cutting or the like.

The heat exchanger core 10 according to some embodiments may be an assembly of a plurality of first partition walls W1 formed by bending a metal sheet material, but is preferably formed as a single piece. When the heat exchanger core 10 is integrally formed as a single piece, the heat exchanger core 10 does not need a gasket for preventing fluid from leaking between components.

If a gasket is used, an appropriate elastic deformation needs to be applied to the gasket to ensure sealing between the components. Then, in order to prevent fluid leakage, it is necessary to disassemble the components of the heat exchanger core and re-tighten the gasket between the components. Since the gasket may be damaged by the gasket tolerance, assembly tolerance, changes in the amount of deformation due to fluid pressure change or gasket aging, or thermal stress, the gasket especially requires maintenance.

In contrast, with the heat exchanger core 10 formed as a single piece according to some embodiments, the labor of maintenance can be significantly reduced because the gasket is not provided.

(Casing and Header)

As shown in FIGS. 1 and 2, the casing 20 according to some embodiments is formed in a substantially cylindrical shape as a whole. The casing 20 is formed of a material having characteristics suitable for a fluid, for example, stainless steel or aluminum alloy.

The casing 20 according to some embodiments includes a casing body 21 having an inner diameter corresponding to the outer diameter of the heat exchanger core 10 with a circular transverse cross-section, and large diameter portions 22 having a larger diameter than the casing body 21. The large diameter portions 22 are disposed at both ends of the casing body 21 in the axial direction D1. These large diameter portions 22 function as a first inlet header 221 and a first outlet header 222.

These headers 221 and 222 have annular interior spaces 221A and 222A (FIG. 2), respectively, as connection spaces around the side wall W0 of the heat exchanger core 10.

In some embodiments, the first inlet header 221 is provided with an inlet port 22A into which the first fluid flows from the outside. In some embodiments, the first outlet header 222 is provided with an outlet port 22B from which the first fluid flows to the outside.

In some embodiments, the inlet port 22A is not limited to one location but may be provided at multiple locations in the circumferential direction D2. For example, two inlet ports 22A may be arranged point-symmetrically with respect to the center of the second transverse cross-section C2. The same applies to the outlet port 22B.

In some embodiments, the interior spaces 221A and 222A of the headers 221 and 222 have sufficient flow passage cross-sectional areas in a direction intersecting the circumferential direction D2, so that the resistance of the first fluid in the interior spaces 221A and 222A is smaller than the resistance of the first fluid in a plurality of radial passages 61, which will be described later. This makes it easy for the first fluid to flow evenly from the first inlet header 221 into the radial passages 61, suppressing the variation in the flow rate between the radial passages 61 when the first fluid flows out through the radial passages 61 to the first outlet header 222.

In some embodiments, a second inlet header 31 is provided at one end portion 10A of the casing 20 in the axial direction D1. A second outlet header 32 is provided at the other end portion 10B of the casing 20 in the axial direction D1.

In some embodiments, an annular seal member (not shown) seals between a flange 31A of the second inlet header 31 and a flange 231 of the casing 20. The same applies to between a flange 32A of the second outlet header 32 and a flange 232 of the casing 20.

In some embodiments, the first passage group G1 is connected to the inside of the first inlet header 221 and the inside of the first outlet header 222.

In some embodiments, the second passage group G2 is connected to the inside of the second inlet header 31 and the inside of the second outlet header 32. The start edge of each second passage 102 is open inside the second inlet header 31. The end edge of each second passage 102 is open inside the second outlet header 32.

The directions in which the first fluid and the second fluid flow into and out of the heat exchanger core 10 can be determined in consideration of the routing of the inflow and outflow, the interference of the headers of the first fluid and the second fluid, etc., as appropriate.

For example, contrary to the above description, the first fluid may be circulated through the second passage group G2, and the second fluid may be circulated through the first passage group G2.

Definition of Substantially Circular, Substantially Annular, and Substantially Concentric In some embodiments, the transverse cross-section of the casing 20 does not necessarily have to be strictly circular, but may be "substantially circular" which can be regarded as approximately circular. Here, the "circular" shape allows tolerances for a perfect circle.

The term "substantially circular" includes, for example, a polygonal shape having many vertices (for example, 10 to 20 sided polygons), and a shape of n rotational symmetry, where n is 10 to 20, for example. In addition, the term "substantially circular" includes a shape in which an arc is continuous over approximately the entire circumferential direction D2 while unevenness is present in a part of the circumference.

Similar to the above, the transverse cross-sections C1 to C3 of the heat exchanger core 10 according to some embodiments do not necessarily have to be strictly circular, but may be "substantially circular". In that case, in the first transverse cross-section C1, it is sufficient that the first passages 101 and the second passages 102 are formed in a "substantially annular" shape which can be regarded as approximately annular. Similarly, it is sufficient that the first passage group G1 and the second passage group G2 are arranged in a substantially concentric shape which can be regarded as approximately concentric. The term "substantially annular" shall conform to the meaning of "substantially circular" described above.

Figure 7:
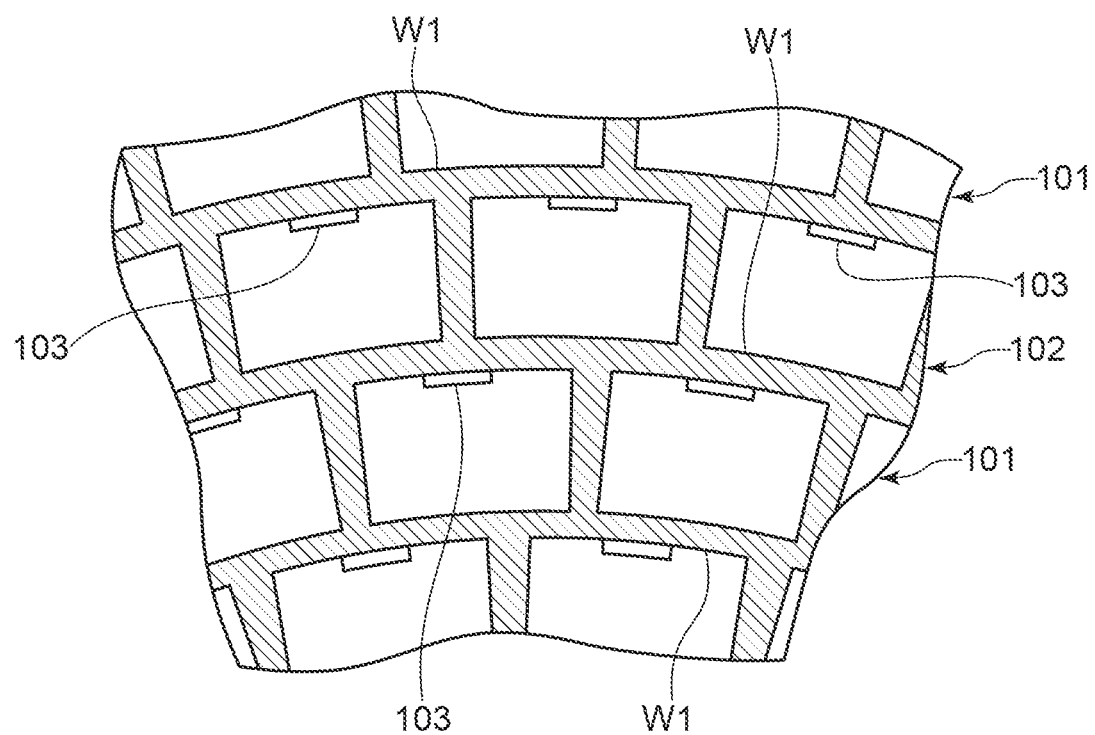
FIG. 7 is a cross-sectional view of a portion of the heat exchanger core according to a modified example of the present disclosure.

In order to increase the heat transfer area, as shown in FIG. 7, the first partition wall W1 may be provided with a plurality of protrusions 103 rising from the first partition wall W1 toward at least one of the first passage 101 or the second passage 102. The protrusion 103 is preferably provided on the first partition wall W1 while avoiding both ends of the first passage 101 in the axial direction D1 in order to cause the first fluid to smoothly flow from the radial passage 61, which will be described later, to the first passage 101 and smoothly flow from the first passage 101 to the radial passage 61 with a reduced pressure loss.

The heat exchanger core 10 provided with the protrusions 103 can be integrally formed by the process of additive manufacturing.

The "concentric" shape, in which multiple circles with different diameters are concentrically arranged, allows tolerances for the coincidence (concentricity) of the centers of circles. That is, the term "substantially concentric" includes a form in which circles are arranged substantially concentrically. Circular elements constituting the concentric circles shall conform to the meaning of "substantially circular" described above. The centers of multiple polygons may be aligned, or the centers of polygons and rotationally symmetric shapes may be aligned to be arranged in a "substantially concentric" shape.

The case where the transverse cross-section of the casing 20 or the heat exchanger core 10 is of circular shape, the transverse cross-sections of the first passages 101 and the second passages 102 are of annular shape, and the first passage group G1 and the second passage group G2 are arranged in a concentric shape is most preferable in terms of stress, heat transfer area, and uniform flow state.

However, even when the transverse cross-section of the casing 20 or the heat exchanger core 10 is of substantially circular shape, or the first passages 101 and the second passages 102 are of substantially annular shape in the first transverse cross-section C1, or the first passage group G1 and the second passage group G2 are arranged in a substantially concentric shape as a whole, it is possible to obtain the same effects as those of the present embodiment described later.

(Explanation of Second Transverse Cross-Section)

The outline of the second transverse cross-section C2 and the radial passage 61 and circumferential passages 66 appearing in the second transverse cross-section C2 according to some embodiments will now be described. Details of the radial passage 61 according to some embodiments will be described separately.

As shown in FIG. 4, which corresponds to the cross-section taken along line IV-IV of FIG. 2, the heat exchanger core 10 has a radial passage 61 crossing the first passage group G1 and the second passage group G2 and communicating with only the first passage group G1. In the second transverse cross-section C2 shown in FIG. 4, the radial passage 61 extends in the radial direction of the heat exchanger core 10 and communicates with the interior space 221A of the first inlet header 221 as shown in FIG. 2. As shown in FIGS. 1 and 2, the radial passage 61 penetrates the side wall W0 in the thickness direction.

In some embodiments, the plurality of first passages 101 extend in the axial direction within the heat exchanger core 10 and communicate with radial passages 61 on one side and the other side in the axial direction. In some embodiments, among the plurality of first passages 101, the first passages 101 arranged in the core body 13 are included in the axial passages 3. Further, in some embodiments, as will be described later, among the plurality of first passages 101, the first passages 101 arranged in the headers 11A, 11B are also referred to as circumferential passages 66. In some embodiments, the circumferential passages 66 are alternately layered with the second passages 102 along the radial direction.

The cross-section taken along line IVx-IVx of FIG. 2 is omitted but is the same as FIG. 4. The transverse cross-section along line IVx-IVx in FIG. 2 also corresponds to the second transverse cross-section C2. The transverse cross-section along line IVx-IVx is referred to as a second transverse cross-section C2x. The radial passage 61 in the second transverse cross-section C2x communicates with the interior space 222A of the first outlet header 222.

In some embodiments, at least one radial passage 61 is disposed in each of the second transverse cross-section C2 and the second transverse cross-section C2x. Preferably, in each of the second transverse cross-section C2 and the second transverse cross-section C2x, a plurality of (for example, eight in the embodiment shown in FIG. 4) radial passages 61 are distributed in the circumferential direction D2. When the plurality of radial passages 61 are distributed in the circumferential direction D2, the stiffness and strength of the heat exchanger core 10 can be made uniform in the circumferential direction D2, and the flow state of the first fluid can be made uniform in the circumferential direction D2.

The greater the number of radial passages 61, the easier it is to equalize the flow rate of the first fluid flowing through each radial passage 61. Then, heat is sufficiently transferred between the first fluid and the second fluid which flow evenly over the entire circumferential direction D2. With this in mind, it is preferable that four or more radial passages 61 are distributed in each of the second transverse cross-sections C2 and C2x. However, the number of radial passages 61 may be 3 or less (including 1) in each of the second transverse cross-sections C2 and C2x.

In some embodiments, the plurality of radial passages 61 are preferably distributed at even intervals in the circumferential direction D2 in order to contribute to uniform flow rate of the first fluid through each radial passage 61. In other words, the heat exchanger core 10 is preferably formed symmetrically with respect to the center of the transverse cross-section in both the second transverse cross-sections C2 and C2x.

The shape of the opening of each radial passage 61 in the side wall W0 is rectangular in the example shown in FIGS. 1 and 2. In the side wall W0, the openings of the radial passages 61 are distributed in the circumferential direction D2.

In addition, similar to the above, in order to contribute to uniform flow rate of the first fluid through each radial passage 61, the phases of the inlet port 22A and the radial passage 61 are preferably shifted from each other, that is, the inlet port 22A and the radial passage 61 are arranged at different positions in the circumferential direction D2. When the phase of the inlet port 22A and the phase of the radial passage 61 are shifted, compared to the case where the phases are not shifted (at the same position in the circumferential direction D2), it is possible to more reliably prevent the flow rate of the first fluid flowing through the radial passage 61 from being biased.

In some embodiments, each radial passage 61 includes a set of tubular crossing walls W3 disposed in the region of the second passages 102. The radial passage 61 is separated from the second passage group G2 by the crossing walls W3. The crossing walls W3 are formed, integrally with the first partition walls W1, between adjacent first partition walls W1, W1 which are adjacent to each other in the radial direction of the heat exchanger core 10. Each first passage 101 communicates with the inside of the crossing walls W3.

All the first passages 101, from the first passage 101 disposed on the outer peripheral side of the heat exchanger core 10 to the first passage (not shown) disposed near the axis of the heat exchanger core 10, communicate with the interior spaces 221A and 222A of the first inlet header 221 and the first outlet header 222 through the radial passages 61 extending radially from the vicinity of the axis of the heat exchanger core 10, and further communicate with the outside of the heat exchanger core 10.

(Explanation of Third Transverse Cross-Section)

Figure 6:
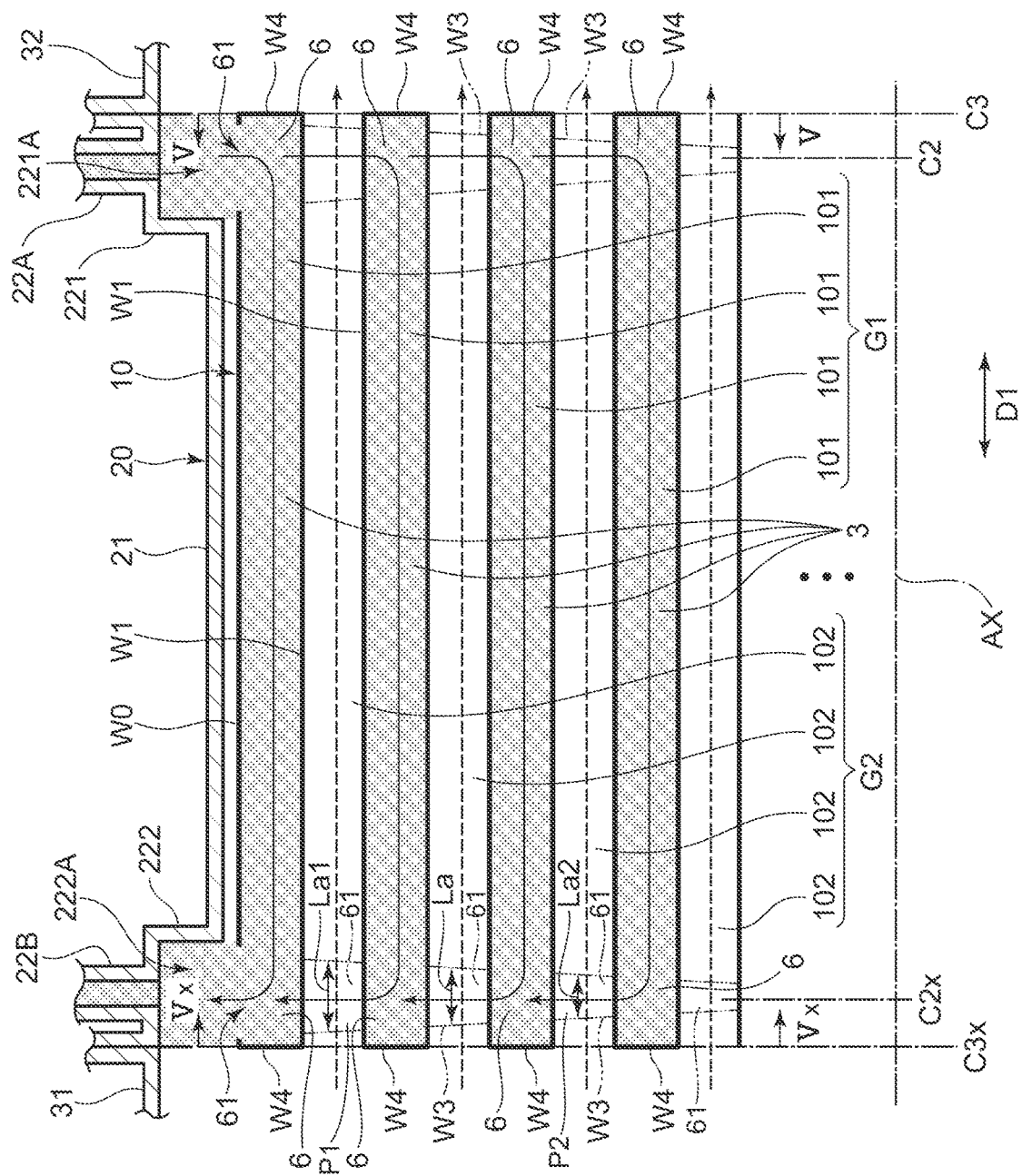
FIG. 6 is a schematic diagram showing the respective flows of the first fluid and the second fluid.

FIG. 5, which corresponds to the cross-section taken along line V-V of FIGS. 2 and 6, shows the third transverse cross-section C3 disposed outward of the second transverse cross-section C2 in the axial direction D1.

In some embodiments, as shown in FIG. 6, the first passage group G1 communicating with the radial passage 61 is provided with a closure wall W4 disposed outward of the second transverse cross-section C2 in the axial direction D1. The first fluid flowing in the first passage group G1 does not flow in the axial direction D1 beyond the closure wall W4 which intersects the axial direction D1. The closure wall W4 closes between adjacent first partition walls W1, W1.

In some embodiments, the first passage group G1 is closed by the closure wall W4 in the third transverse cross-section C3 (FIG. 5). Accordingly, only the second passage group G2 exists in the third transverse cross-section C3. Since the closure wall W4 exists in the region shown by the grid pattern in FIG. 5, the first passage group G1 does not exist.

The second passage group G2 is open to the second inlet header 31 and the second outlet header 32 at the end portions of the heat exchanger core 10.

The cross-section taken along line Vx-Vx of FIG. 2 is omitted but is the same as FIG. 5. In some embodiments, the transverse cross-section taken along line Vx-Vx of FIG. 2 corresponds to a third transverse cross-section C3x disposed outward of the second transverse cross-section C2x in the axial direction D1. The transverse cross-section along line Vx-Vx is referred to as a third transverse cross-section C3x.

In some embodiments, as shown in FIG. 6, the first passage group G1 is closed by a closure wall W4 in the third transverse cross-section C3x. Accordingly, only the second passage group G2 exists in the third transverse cross-section C3x.

(Flows of First Fluid and Second Fluid)

With reference to FIGS. 2, 4, and 6, the respective flows of the first fluid and the second fluid in the heat exchanger core 10 will be described. FIG. 6 shows a portion of the vertical cross-section of the heat exchanger core 10.

In some embodiments, as shown by the dashed arrow in FIG. 6, the second fluid entering the inside of the second inlet header 31 through an inlet port (not shown) flows into the start edges of the second passages 102 of the second passage group G2. At this time, since the second passage group G2 is formed symmetrically with respect to the center of the third transverse cross-section C3, i.e., the axis AX, the second fluid uniformly flows into the second passages 102 over the entire circumferential direction D2 and flows through the second passages 102 in the axial direction D1. The second fluid flows from the end edges of the second passages 102 to the inside of the second outlet header 32, and flows out of the heat exchanger 1 through an outlet port (not shown).

In some embodiments, as shown by the solid arrow in FIG. 6, the first fluid entering the inside of the first inlet header 221 through the inlet port 22A flows from the first inlet header 221 to the first passage group G1 through the radial passages 61 opening to the side wall W0 evenly over the circumferential direction D2.

At this time, the first fluid is distributed from the first inlet header 221 to the plurality of radial passages 61 without being biased toward some radial passages 61 near the inlet port 22A. In each radial passage 61, the first fluid flows inward in the radial direction of the heat exchanger core 10 inside the crossing walls W3 shown by the dashed two-dotted line in FIG. 6 and is distributed to each first passage 101.

Then, depending on the symmetry of the heat exchanger core 10 in the second transverse cross-section C2 where the radial passages 61 are located, the flow rate of the first fluid flowing through the first passages 101 in the axial direction D1 is maintained uniform over the entire circumferential direction D2. Therefore, heat is sufficiently transferred between the second fluid flowing through the second passages 102 and the first fluid flowing through the first passages 101, over the entire range where the second transverse cross-section C2 is continuous, under a countercurrent flow in which a large temperature difference can be easily obtained while flowing through the passages 101 and 102.

Upon reaching the end edge of each first passage 101, the first fluid flowing through the first passage 101 in the axial direction D1 turns the direction of flow from the axial direction D1 to the radial direction. Then, in each radial passage 61 arranged radially from the axis of the heat exchanger core 10, the fluid passes inside the crossing walls W3 while merging, and flows outward in the radial direction of the heat exchanger core 10. Then, the first fluid flows from the radial passage 61 to the inside of the first outlet header 222, and flows out of the heat exchanger 1 through the outlet port 22B.

(Main Effect of Heat Exchanger According to Embodiment)

With the heat exchanger 1 according to some embodiments described above, due to not only the casing 20 that is symmetrical with respect to the axis, but also the heat exchanger core 10 in which the first passage group G1 and the second passage group G2 are symmetrically and concentrically layered, the stress acting due to the pressure of the fluid or the like is uniformly distributed throughout the heat exchanger core 10, a large heat transfer area between the first fluid and the second fluid is obtained, and heat is efficiently exchanged over the entire heat exchanger core 10 in which the first fluid and the second fluid flow evenly.

Thus, damage to the heat exchanger core 10 can be prevented to improve reliability, and the same heat exchange capacity can be obtained with a smaller heat exchanger core 10.

Detail of Radial Passage According to Some Embodiments

Details of the radial passage according to some embodiments will now be described.

In the heat exchanger core 10 according to some embodiments, since the first header 11A and the second header 11B have the same structure, in the following description, unless there is a particular need to distinguish between the first header 11A and the second header 11B, they will be referred to simply as the header 11 without the alphabetical letters A and B.

A modified example of the radial passage 61 and the circumferential passage 66 will be described later separately.

Unless otherwise specified, the contents of the description described above shall apply to the modified example of the radial passage 61 and the circumferential passage 66 which will be described later.

In addition, the contents regarding embodiments described below may also apply to the modified example of the radial passage 61 and circumferential passage 66 which will be described later, as long as they do not conflict with the modified example of the radial passage 61 and the circumferential passage 66 described later.

(Flow Passage Area of Radial Passage)

In the heat exchanger core 10 according to some embodiments, the header passage 6 includes at least one radial passage 61 extending along the radial direction. The header passage 6 includes a plurality of circumferential passages 66 branched from each radial passage 61 and communicating with one or more axial passages 3, respectively.

The flow passage area Ca2 of each radial passage 61 in the second position P2 radially inward of the first position P1 is smaller than the flow passage area Ca1 in the first position P1.

Here, the flow passage area Ca of the radial passage 61 is a cross-sectional area of the radial passage 61 that appears when the radial passage 61 is cut along a plane orthogonal to the extension direction of the radial passage 61 (i.e., radial direction).

Further, the first position P1 and the second position P2 are positions assumed to represent a relative positional relationship in the radial direction in the radial passage 61, and do not refer to a specific radial position. For example, in the radial passage 61, when a certain radial position Pa is defined as the first position P1, any position radially inward of the radial position Pa can be the second position.

In the heat exchanger core 10 according to some embodiments, the circumferential dimension Lc2 of the radial passage 61 in the second position P2 may be smaller than the circumferential dimension Lc1 (see FIG. 4) of the radial passage 61 in the first position P1 to make the flow passage area Ca2 in the second position P2 smaller than the flow passage area Ca1 in the first position P1. Further, the axial dimension La2 of the radial passage 61 in the second position P2 may be smaller than the axial dimension La1 (see FIG. 6) of the radial passage 61 in the first position P1 to make the flow passage area Ca2 in the second position P2 smaller than the flow passage area Ca1 in the first position P1.

That is, at least one of the circumferential dimension Lc1 or the axial dimension La1 of the radial passage 61 in the first position P1 may be different from the circumferential dimension Lc2 or the axial dimension La2 of the radial passage 61 in the second position P2 to make the flow passage area Ca2 in the second position P2 smaller than the flow passage area Ca1 in the first position P1.

In the radial passage 61, the flow rate of the fluid and the pressure loss tend to increase in a radially outer region. Therefore, reducing the pressure loss in this region contributes to the reduction of the pressure loss of the entire heat exchanger core 10.

According to the above configuration, the flow passage area Ca2 in the second position P2 is smaller than the flow passage area Ca1 in the first position P1. In other words, according to the above configuration, the flow passage area Ca1 in the first position P1 is larger than the flow passage area Ca2 in the second position P2. With this configuration, the pressure loss in the radially outer region of the radial passage 61 can be reduced, so that the pressure loss of the entire heat exchanger core 10 can be reduced. Thus, in the axial passages 3 connected to the radial passage 61 via the circumferential passages 66, the difference in flow rate depending on the radial position can be suppressed, and the heat exchange efficiency in the heat exchanger core 10 can be improved.

As described above, the circumferential dimension Lc2 of each radial passage 61 in the second position P2 may be smaller than the circumferential dimension Lc1 in the first position P1.

With this configuration, the flow passage area Ca1 in the first position P1 can be made larger than the flow passage area Ca2 in the second position P2.

In order to make the flow passage area Ca1 in the first position P1 larger than the flow passage area Ca2 in the second position P2, as described above, there are two ways to make the circumferential dimension Lc1 in the first position P1 larger than the circumferential dimension Lc2 in the second position P2, and make the axial dimension La1 in the first position P1 larger than the axial dimension La2 in the second position P2.

In this case, when the flow passage area Ca is changed by mainly changing the circumferential dimension Lc between the first position P1 and the second position P2, the axial dimension La of each radial passage 61 can be reduced over the entire range along the radial direction. Thus, the axial dimension of the header 11 can be reduced.

As described above, the axial dimension La2 of each radial passage 61 in the second position P2 may be smaller than the axial dimension La1 in the first position P1.

With this configuration, the flow passage area Ca1 in the first position P1 can be made larger than the flow passage area Ca2 in the second position P2.

When the flow passage area Ca is changed by mainly changing the axial dimension La between the first position P1 and the second position P2, the circumferential dimension Lc of each radial passage 61 can be reduced over the entire range along the radial direction. As a result, the proportion of the region occupied by the radial passages 61 in the cross-section (second transverse cross-section C2) of the header 11 when viewed from the axial direction D1 can be decreased, and the proportion of the region occupied by the circumferential passages 66 can be increased.

The header 11 according to some embodiments may be configured such that the flow passage area Ca gradually decreases inward in the radial direction.

With this configuration, since the radial passage 61 is formed such that the flow passage area Ca gradually increases outward in the radial direction, the formation of a sudden change portion of the flow passage area Ca can be avoided, and the pressure loss in the radial passage 61 can be reduced.

(Opening by Radial Passage)

As shown in FIG. 1, in the heat exchanger core 10 according to some embodiments, at least one opening 63 is formed by at least one radial passage 61 on the outer peripheral surface of the heat exchanger core 10 in the header 11. In the heat exchanger core 10 according to some embodiments, the total area $\Sigma Oa$ of opening areas Oa of each opening 63 may be equal to or smaller than the total area $\Sigma Sc$ of areas Sc of the plurality of circumferential passages 66 when viewed from the axial direction D1.

In the heat exchanger core 10 according to some embodiments, when the radial passage 61 is formed such that the total area $\Sigma Oa$ of opening areas Oa of each opening 63 is larger than the total area $\Sigma Sc$ of areas Sc of the plurality of circumferential passages 66 when viewed from the axial direction D1, the pressure loss of the fluid in the circumferential passages 66 has more influence than the pressure loss in the radial passage 61. Thus, even when the total area $\Sigma Oa$ of opening areas Oa of each opening 63 is increased so as to exceed the total area $\Sigma Sc$ of areas Sc of the plurality of circumferential passages 66 when viewed from the axial direction D1, as compared to the case where the total area $\Sigma Oa$ of opening areas Oa of each opening 63 is equal to the total area $\Sigma Sc$ of areas Sc of the plurality of circumferential passages 66 when viewed from the axial direction D1, the effect of reducing the pressure loss in the radially outer region of the radial passage 61 does not increase much.

On the contrary, when the total area $\Sigma Oa$ of opening areas Oa of each opening 63 is increased so as to exceed the total area $\Sigma Sc$ of areas Sc of the plurality of circumferential passages 66 when viewed from the axial direction D1, the circumferential dimension Lc and the axial dimension La of the radial passage 61 are increased, which may cause the following effects.

Specifically, when the circumferential dimension Lc of the radial passage 61 is increased, the proportion of the region occupied by the radial passages 61 in the cross-section (second transverse cross-section C2) of the header 11 when viewed from the axial direction D1 may be increased, and the proportion of the region occupied by the circumferential passages 66 may be decreased.

Further, when the axial dimension La of the radial passage 61 is increased, the axial dimension of the header 11 may be increased.

With the heat exchanger core 10 according to some embodiments, while suppressing the influence on the region occupied by the circumferential passages 66 in the cross-section (second transverse cross-section C2) of the header 11 when viewed from the axial direction D1 and the influence on the axial dimension of the header 11, the pressure loss can be effectively reduced in the radially outer region of the radial passage 61.

(Shape of Opening)

Figure 8:
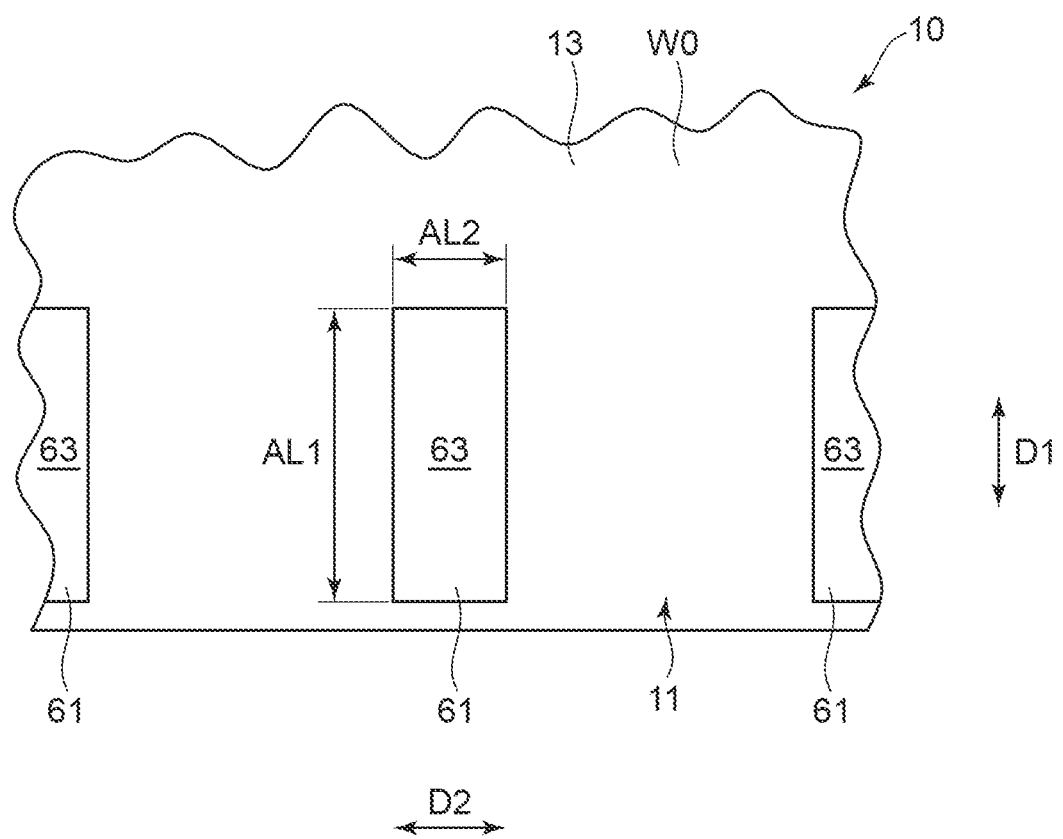
FIG. 8 is a schematic diagram of a portion of the side surface of the heat exchanger core in the vicinity of the header according to some embodiments, showing an example of the shape of the opening.

FIG. 8 is a schematic diagram of a portion of the side surface of the heat exchanger core 10 in the vicinity of the header 11 according to some embodiments, showing an example of the shape of the opening 63.

Figure 9:
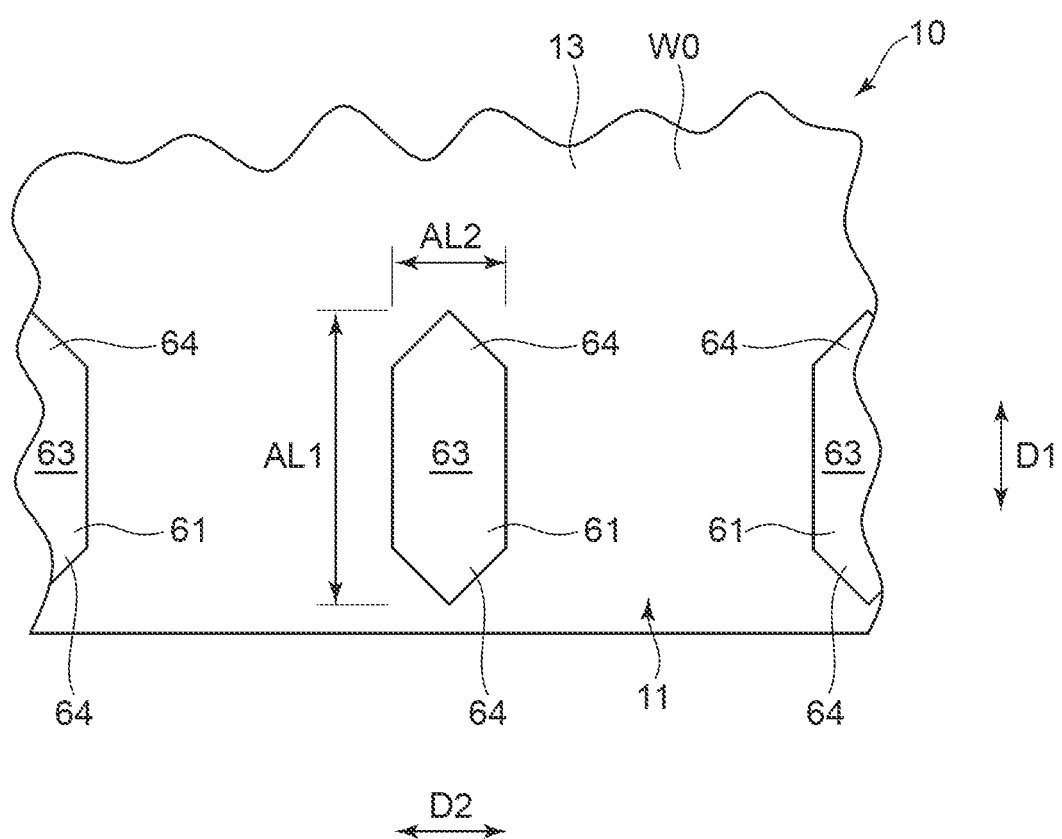
FIG. 9 is a schematic diagram of a portion of the side surface of the heat exchanger core in the vicinity of the header according to some embodiments, showing another example of the shape of the opening.

FIG. 9 is a schematic diagram of a portion of the side surface of the heat exchanger core 10 in the vicinity of the header 11 according to some embodiments, showing another example of the shape of the opening 63.

In the heat exchanger core 10 according to some embodiments, the flow rate of the fluid is relatively high in the vicinity of the opening 63 of the radial passage 61, so that the pressure loss tends to be relatively large. It is thus desirable to increase the opening area in the vicinity of the opening 63 as much as possible. However, when the radial passage 61 is enlarged in the circumferential direction D2, the flow of the fluid in the axial passages 3 may be affected. It is thus desirable to suppress the enlargement of the passage width in the circumferential direction D2. Therefore, in the radial passage 61, it is preferable to enlarge the passage width in the axial direction D1.

In view of this, in the heat exchanger core 10 according to some embodiments, the shape of the opening 63 is set as follows.

Specifically, in the heat exchanger core 10 according to some embodiments, as shown in FIGS. 8 and 9, the opening dimension AL1 along the axial direction D1 of each opening 63 is one or more times the opening dimension AL2 along the circumferential direction D2 of each opening 63 (1.0× AL2≤AL1).

With this configuration, it is possible to reduce the opening dimension AL2 along the circumferential direction D2 of each opening 63. As a result, since the dimension of each radial passage 61 along the circumferential direction D2 is reduced, the proportion of the region occupied by the radial passages 61 in the cross-section (second transverse cross-section C2) of the header 11 when viewed from the axial direction D1 can be decreased, and the proportion of the region occupied by the circumferential passages 66 can be increased.

For example, in the heat exchanger core 10 shown in FIG. 8, the opening 63 has a rectangular shape when viewed from the radially outer side. Further, for example, in the heat exchanger core 10 shown in FIG. 9, end portions 64 of the opening 63 along the axial direction are formed such that their dimension along the circumferential direction D2 decreases toward the outer side of the radial passage 61 along the axial direction D1 when viewed from the radially outer side. That is, in the heat exchanger core 10 according to some embodiments, the radial passage 61 may be formed such that at least one of two end portions 64 of the radial passage 61 along the axial direction D1 has a dimension AL2 in the circumferential direction D2 that decreases outward along the axial direction D1.

With this configuration, for example as described later, when the heat exchanger core 10 is formed by additive manufacturing with the axial direction D1 as the stacking direction, the end portions 64 of the radial passage 61 along the axial direction D1 are difficult to form an overhang region. This simplifies or eliminates the process of forming a support for formation of the overhang region and the process of removing the formed support.

(Change in Flow Passage Area of Radial Passage with Respect to Change in Radial Position)

Figure 10:
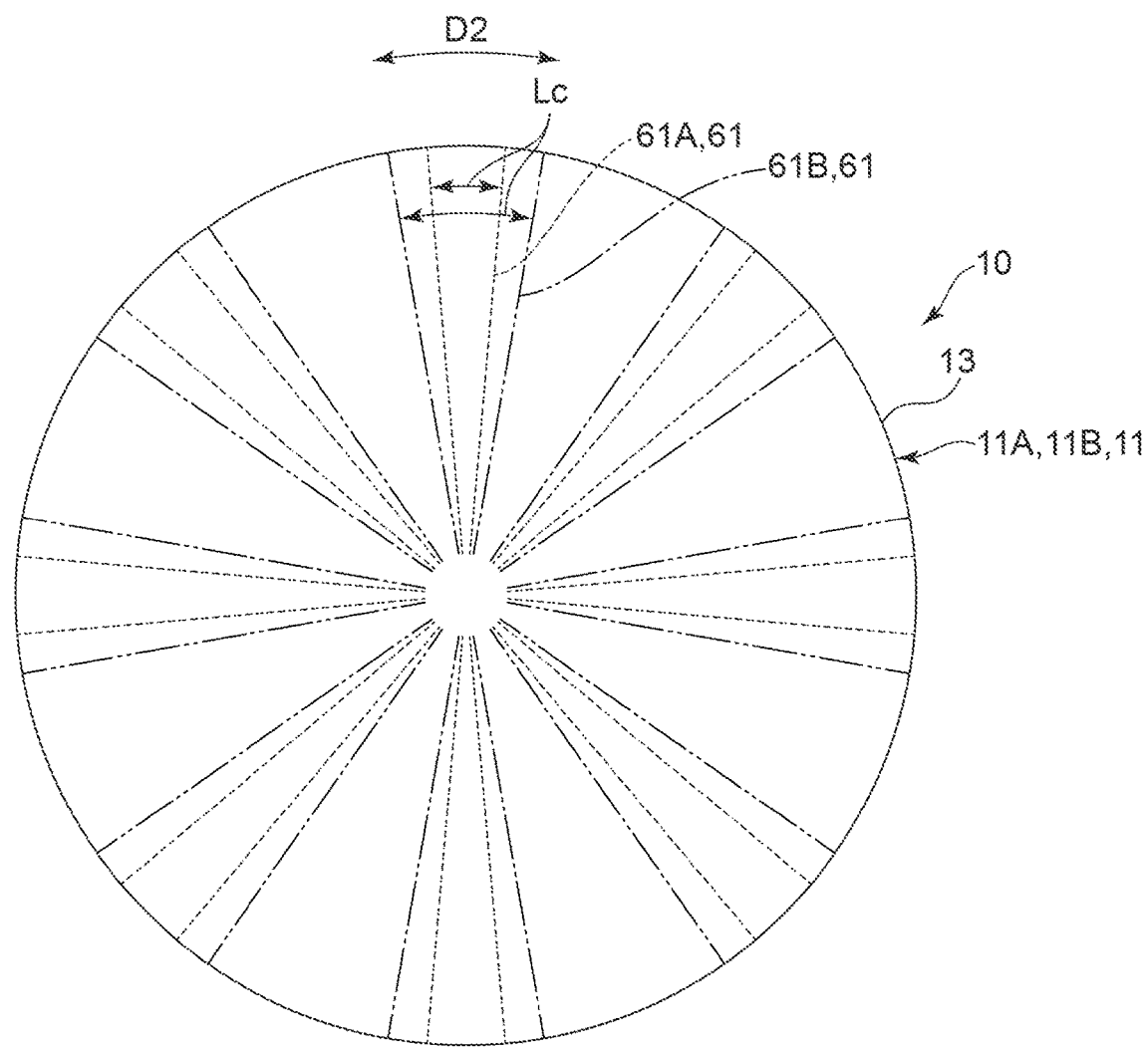
FIG. 10 is a schematic diagram for describing the change in flow passage area of the radial passage with respect to the change in radial position.

FIG. 10 is a schematic diagram for describing the change in flow passage area Ca of the radial passage 61 with respect to the change in radial position, when the heat exchanger core 10 is viewed along the axial direction D1.

For convenience of explanation, in FIG. 10, the schematic shape of the first radial passage 61A, which is the radial passage 61 in the first header 11A, and the schematic shape of the second radial passage 61B, which is the radial passage 61 in the second header 11B, are superimposed along the axial direction D1. In FIG. 10, for convenience of explanation, the schematic shape of the first radial passage 61A is shown by the dashed line, and the schematic shape of the second radial passage 61B is shown by the dashed two-dotted line.

Figure 11:
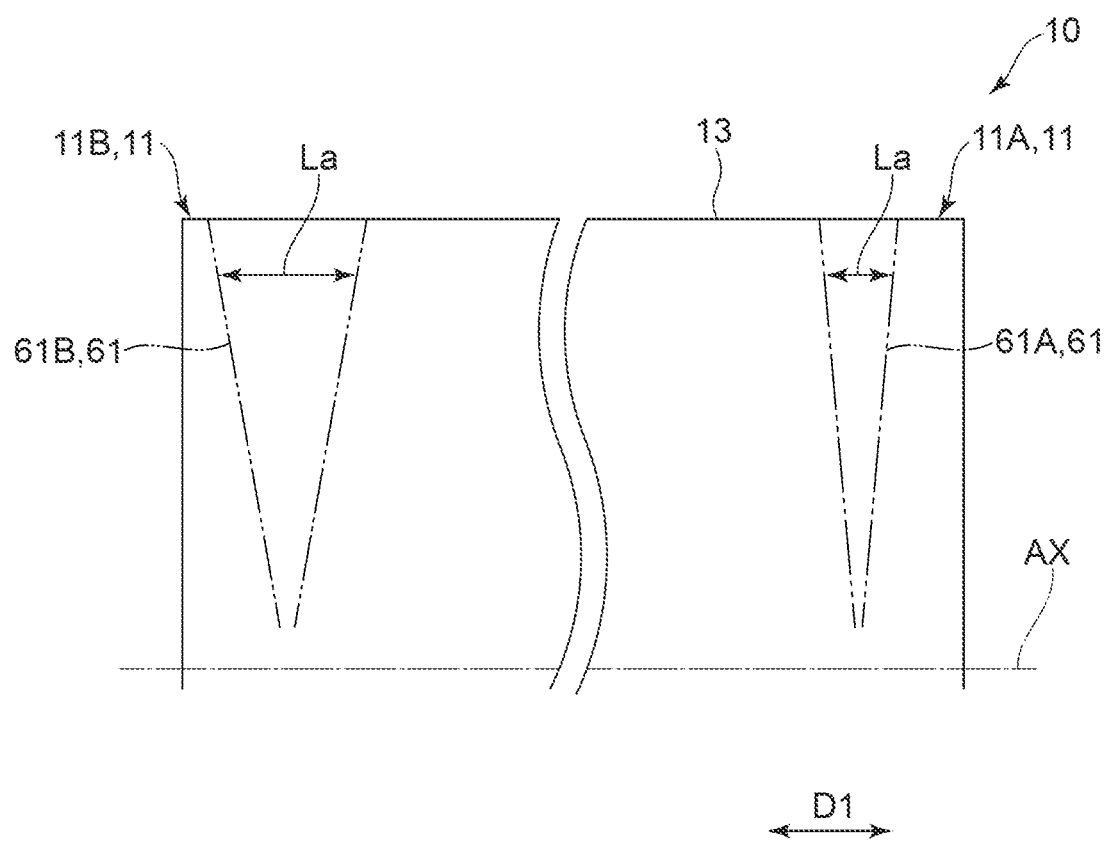
FIG. 11 is a schematic diagram for describing the change in flow passage area of the radial passage with respect to the change in radial position.

FIG. 11 is a schematic diagram for describing the change in flow passage area Ca of the radial passage 61 with respect to the change in radial position, when the heat exchanger core 10 is viewed along the radial direction. In FIG. 11, the schematic shape of the first radial passage 61A and the schematic shape of the second radial passage 61B are shown by the dashed two-dotted line.

In the heat exchanger core 10 according to some embodiments, as described above, in the vicinity of the opening 63 of the radial passage 61, the flow rate of the fluid is relatively high, so that the dynamic pressure is relatively large. On the other hand, in the vicinity of the center of the cylinder of the radial passage 61, the flow rate is lower than that in the vicinity of the opening 63, so that the dynamic pressure is very small as compared in the vicinity of the opening 63.

When the difference in dynamic pressure between different radial positions increases to some extent or more, the deviation between the axial passage 3 near the opening 63 (that is, on the radially outer side) and the axial passage 3 near the center increases, which may lead to a reduction in performance of the heat exchanger core 10.

Since this deviation tends to increase as the dynamic pressure increases, a fluid with high density tends to have a large deviation.

Therefore, it is preferable that the higher the density of the fluid, the more the area increase rate Rca, which will be described later, is increased to reduce the flow velocity in the vicinity of the opening 63.

The density of a fluid generally depends on the temperature. Further, the density change with temperature is generally greater in gas than in liquid.

Therefore, in the case where the temperature of the fluid changes during flow through the heat exchanger core 10, it may be preferable that the radial passage 61 in the header 11 disposed on the upstream side with respect to the fluid flow and the radial passage 61 in the header 11 disposed on the downstream side with respect to the fluid flow have different area increase rates Rca, which will be described later.

In view of this, in the heat exchanger core 10 according to some embodiments, the shape of the radial passage 61 is set as follows.

Specifically, in the heat exchanger core 10 according to some embodiments, the area increase rate Rca of the flow passage area Ca of at least one radial passage 61 increasing from the inner side to the outer side in the radial direction differs between at least one radial passage 61 (first radial passage 61A) in the first header 11A and at least one radial passage 61 (second radial passage 61B) in the second header 11B.

Here, the area increase rate Rca is a value obtained by dividing the difference (Ca1−Ca2), which is the difference between the flow passage area Ca1 in the first position P1 and the flow passage area Ca2 in the second position P2, by the difference between the radial positions of the first position P1 and the second position P2.

In order to make the area increase rate Rca of the first radial passage 61A different from that of the second radial passage 61B, for example, as shown in FIG. 10, the dimension increase rate R1c of the circumferential dimension Lc increasing from the inner side to the outer side in the radial direction of the first radial passage 61A may be different from that of the second radial passage 61B. Further, in order to make the area increase rate Rca of the first radial passage 61A different from that of the second radial passage 61B, for example, as shown in FIG. 11, the dimension increase rate R1a of the axial dimension La increasing from the inner side to the outer side in the radial direction of the first radial passage 61A may be different from that of the second radial passage 61B.

That is, at least one of the dimension increase rate R1c of the circumferential dimension Lc1 or the dimension increase rate R1a of the axial dimension La1 of the first radial passage 61A may be different from that of the second radial passage 61B to make the area increase rate Rca of the first radial passage 61A different from that of the second radial passage 61B.

In the heat exchanger core 10 according to some embodiments, it is desirable that the difference in static pressure between the first header 11A and the second header 11B at any radial position of the radial passage 61 is constant regardless of the radial position.

When the fluid flowing through the heat exchanger core 10 is a gas, for example, the rate of density change with temperature change tends to be higher than a liquid, as described above. Therefore, if the area increase rate Rca is the same between the first radial passage 61A and the second radial passage 61B, the difference in static pressure may greatly vary depending on the radial position.

According to the above configuration, since the area increase rate Rca differs between the first radial passage 61A and the second radial passage 61B, it is possible to prevent the difference in static pressure from varying depending on the radial position.

(Method of Producing Heat Exchanger Core)

Hereinafter, an example of the method of producing the above-described heat exchanger core 10 according to some embodiments will be described.

Figure 12:
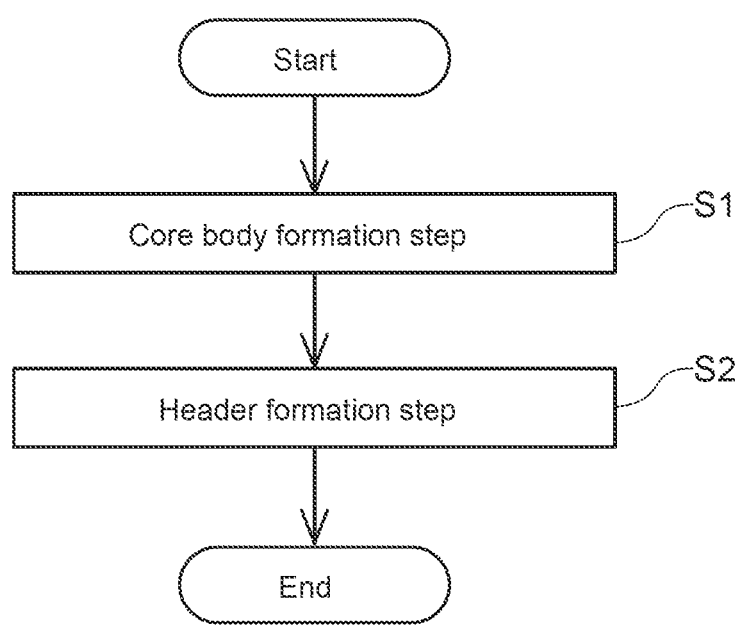
FIG. 12 is a flowchart showing the procedure of the method of producing the heat exchanger core according to some embodiments.

FIG. 12 is a flowchart showing the procedure of the method of producing the heat exchanger core 10 according to some embodiments.

The method of producing the heat exchanger core 10 according to some embodiments includes a core body formation step S1 of forming a core body 13 including a plurality of axial passages 3 extending along the axial direction D1 by additive manufacturing, and a header formation step S3 of forming a header 11 adjacent to at least one end portion of the core body 13 in the axial direction D1 and having a header passage 6 communicating with the plurality of axial passages 3 by additive manufacturing.

The header formation step S3 includes forming the header passage 6 so as to include at least one radial passage 61 extending along the radial direction, and a plurality of circumferential passages 66 branched from any radial passage 61 and communicating with one or more axial passages 3, respectively.

Further, the header formation step S3 may include forming each radial passage 61 such that the flow passage area Ca2 in the second position P2 radially inward of the first position P1 is smaller than the flow passage area Ca1 in the first position P1.

Further, the header formation step S3 may include forming the header 11 such that at least one opening 63 is formed by the at least one radial passage 61 on the outer peripheral surface of the heat exchanger core 10 in the header 11, and the opening dimension AL1 along the axial direction D1 of each opening 63 is one or more times the opening dimension AL2 along the circumferential direction D2 of each opening 63.

Thus, since the heat exchanger core 10 can be integrally formed by additive manufacturing, it is not necessary to assemble components or seal the components with a gasket. Thus, it is possible to significantly reduce the maintenance work.

The present disclosure is not limited to the embodiments described above, but includes modifications to the embodiments described above, and embodiments composed of combinations of those embodiments.

The contents described in the above embodiments would be understood as follows, for instance.

(1) A heat exchanger core 10 according to at least one embodiment of the present disclosure includes a core body 13 and a header 11. The core body 13 includes a plurality of axial passages 3 extending along the axial direction D1. The header 11 is adjacent to at least one end portion of the core body 13 in the axial direction D1 and has a header passage 6 communicating with the plurality of axial passages 3. The header passage 6 includes at least one radial passage 61 extending along the radial direction. The header passage 6 includes a plurality of circumferential passages 66 branched from each radial passage 61 and communicating with one or more axial passages 3, respectively. The flow passage area Ca2 of each radial passage 61 in the second position P2 is smaller than the flow passage area Ca1 in the first position P1, where the second position P2 is inward of the first position P1 in the radial direction.

In the radial passage 61, the flow rate of the fluid and the pressure loss tend to increase in a radially outer region. Therefore, reducing the pressure loss in this region contributes to the reduction of the pressure loss of the entire heat exchanger core 10.

According to the above configuration (1), the flow passage area Ca2 in the second position P2 radially inward of the first position P1 is smaller than the flow passage area Ca1 in the first position P1. In other words, according to the above configuration (1), the flow passage area Ca1 in the first position P1 radially outward of the second position P2 is larger than the flow passage area Ca2 in the second position P2. With this configuration, the pressure loss in the radially outer region of the radial passage 61 can be reduced, so that the pressure loss of the entire heat exchanger core 10 can be reduced. Thus, in the axial passages 3 connected to the radial passage 61 via the circumferential passages 66, the difference in flow rate depending on the radial position can be suppressed, and the heat exchange efficiency in the heat exchanger core 10 can be improved.

(2) In some embodiments, in the above configuration (1), the circumferential dimension Lc2 of each radial passage 61 in the second position P2 is smaller than the circumferential dimension Lc1 in the first position P1.

According to the above configuration (2), since the circumferential dimension Lc2 of each radial passage 61 in the second position P2 is smaller than the circumferential dimension Lc1 in the first position P1, i.e., the circumferential dimension Lc1 in the first position P1 is larger than the circumferential dimension Lc2 in the second position P2, the flow passage area Ca1 in the first position P1 can be made larger than the flow passage area Ca2 in the second position P2.

When the flow passage area Ca is changed by mainly changing the circumferential dimension Lc between the first position P1 and the second position P2, the dimension La along the axial direction D1 of each radial passage 61 can be reduced over the entire range along the radial direction. Thus, the axial dimension of the header 11 can be reduced.

(3) In some embodiments, in the above configuration (1) or (2), the axial dimension La2 of each radial passage 61 in the second position P2 is smaller than the axial dimension La1 in the first position P1.

According to the above configuration (3), since the axial dimension La2 of each radial passage 61 in the second position P2 is smaller than the axial dimension La1 in the first position P1, i.e., the axial dimension La1 in the first position P1 is larger than the axial dimension La2 in the second position P2, the flow passage area Ca1 in the first position P1 can be made larger than the flow passage area Ca2 in the second position P2.

When the flow passage area Ca is changed by mainly changing the axial dimension La between the first position P1 and the second position P2, the circumferential dimension Lc of each radial passage 61 can be reduced over the entire range along the radial direction. As a result, the proportion of the region occupied by the radial passages 61 in the cross-section (second transverse cross-section C2) of the header 11 when viewed from the axial direction D1 can be decreased, and the proportion of the region occupied by the circumferential passages 66 can be increased.

(4) In some embodiments, in any one of the above configurations (1) to (3), the flow passage area Ca gradually decreases inward in the radial direction.

According to the above configuration (4), since the radial passage 61 is formed such that the flow passage area Ca gradually increases outward in the radial direction, the formation of a sudden change portion of the flow passage area Ca can be avoided, and the pressure loss in the radial passage 61 can be reduced.

(5) In some embodiments, in any one of the above configurations (1) to (4), at least one opening 63 is formed by the at least one radial passage 61 on the outer peripheral surface of the heat exchanger core 10 in the header 11. The total area ΣOa of opening areas Oa of each opening 63 is equal to or smaller than the total area ΣSc of areas Sc of the plurality of circumferential passages 66 when viewed from the axial direction D1.

According to the above configuration (5), while suppressing the influence on the region occupied by the circumferential passages 66 in the cross-section (second transverse cross-section C2) of the header 11 when viewed from the axial direction D1 and the influence on the axial dimension of the header 11, the pressure loss can be effectively reduced in the radially outer region of the radial passage 61.

(6) In some embodiments, in any one of the above configurations (1) to (5), at least one opening 63 is formed by the at least one radial passage 61 on the outer peripheral surface of the heat exchanger core 10 in the header 11. The opening dimension AL1 along the axial direction D1 of each opening 63 is one or more times the opening dimension AL2 along the circumferential direction D2 of each opening 63.

According to the above configuration (6), it is possible to reduce the opening dimension AL2 along the circumferential direction D2 of each opening 63. As a result, since the dimension of each radial passage 61 along the circumferential direction D2 is reduced, the proportion of the region occupied by the radial passages 61 in the cross-section (second transverse cross-section C2) of the header 11 when viewed from the axial direction D1 can be decreased, and the proportion of the region occupied by the circumferential passages 66 can be increased.

(7) In some embodiments, in any one of the above configurations (1) to (6), the at least one radial passage 61 is formed such that at least one of two end portions 64 of the radial passage 61 along the axial direction D1 has a dimension in the circumferential direction D2 that decreases outward along the axial direction D1.

According to the above configuration (7), for example, when the heat exchanger core 10 is formed by additive manufacturing with the axial direction D1 as the stacking direction, the end portions 64 of the radial passage 61 along the axial direction D1 are difficult to form an overhang region. This simplifies or eliminates the process of forming a support for formation of the overhang region and the process of removing the formed support.

(8) In some embodiments, in any one of the above configurations (1) to (7), the header 11 includes a first header 11A adjacent to the one end portion of the core body 13 in the axial direction D1 and a second header 11B adjacent to the other end portion of the core body 13 in the axial direction D1. The area increase rate Rca of the flow passage area Ca of the at least one radial passage 61 increasing from the inner side to the outer side in the radial direction differs between at least one radial passage 61 in the first header 11A and at least one radial passage 61 in the second header 11B.

According to the above configuration (8), since the area increase rate Rca differs between the radial passage 61 in the first header 11A and the radial passage 61 in the second header 11B, it is possible to suppress the difference in static pressure from varying depending on the radial position.

(9) A heat exchanger core 10 according to at least one embodiment of the present disclosure includes a core body 13 and a header 11. The core body 13 includes a plurality of axial passages 3 extending along the axial direction D1. The header 11 is adjacent to at least one end portion of the core body 13 in the axial direction D1 and has a header passage 6 communicating with the plurality of axial passages 3.

The header passage 6 includes at least one radial passage 61 extending along the radial direction. The header passage 6 includes a plurality of circumferential passages 66 branched from each radial passage 61 and communicating with one or more axial passages 3, respectively.

At least one opening 63 is formed by the at least one radial passage 61 on the outer peripheral surface of the heat exchanger core 10 in the header 11.

The opening dimension AL1 along the axial direction D1 of each opening 63 is one or more times the opening dimension AL2 along the circumferential direction D2 of each opening 63.

According to the above configuration (9), it is possible to reduce the opening dimension AL2 along the circumferential direction D2 of each opening 63. As a result, since the dimension of each radial passage 61 along the circumferential direction D2 is reduced, the proportion of the region occupied by the radial passages 61 in the cross-section (second transverse cross-section C2) of the header 11 when viewed from the axial direction D1 can be decreased, and the proportion of the region occupied by the circumferential passages 66 can be increased.

(10) In some embodiments, in the above configuration (9), the total area ΣOa of opening areas Oa of each opening 63 is equal to or smaller than the total area ΣSc of areas Sc of the plurality of circumferential passages 66 when viewed from the axial direction D1.

According to the above configuration (10), while suppressing the influence on the region occupied by the circumferential passages 66 in the cross-section (second transverse cross-section C2) of the header 11 when viewed from the axial direction D1 and the influence on the axial dimension of the header 11, the pressure loss can be effectively reduced in the radially outer region of the radial passage 61.

(11) In some embodiments, in the above configuration (9) or (10), the at least one radial passage 61 is formed such that at least one of two end portions 64 of the radial passage 61 along the axial direction D1 has a dimension in the circumferential direction D2 that decreases outward along the axial direction D1.

According to the above configuration (11), for example, when the heat exchanger core 10 is formed by additive manufacturing with the axial direction D1 as the stacking direction, the end portions 64 of the radial passage 61 along the axial direction D1 are difficult to form an overhang region. This simplifies or eliminates the process of forming a support for formation of the overhang region and the process of removing the formed support.

(12) In some embodiments, in any one of the above configurations (1) to (11), the plurality of axial passages 3 are arranged in an annular shape when viewed from the axial direction D1.

According to the above configuration (12), the stress acting due to the pressure of the fluid or the like can be uniformly distributed throughout the heat exchanger core 10.

(13) In some embodiments, in any one of the above configurations (1) to (12), each of the axial passages 3 is divided into a plurality of sections S in the circumferential direction D2.

According to the above configuration (13), it is possible to improve the heat transfer efficiency with the walls which divide the axial passage 3. The walls improve the stiffness and strength of the heat exchanger core 10, especially in the radial direction.

(14) In some embodiments, in the above configuration (13), the plurality of sections S of the axial passages (13) have a uniform flow passage diameter.

According to the above configuration (14), the flow state such as friction loss is made uniform among all the sections, so that the heat transfer coefficient is made uniform among all the sections, and the stress is uniformly dispersed in the entire in-plane direction of the transverse cross-section of the heat exchanger core 10, thus equalizing the stress.

(15) A heat exchanger 1 according to at least one embodiment of the present disclosure is provided with: the heat exchanger core 10 having any one of the above configurations (1) to (14); and a casing 20 accommodating the heat exchanger core 10.

According to the above configuration (15), the heat exchanger 1 can be relatively downsized, and the heat exchange efficiency can be improved.

(16) A method of producing a heat exchanger core 10 according to at least one embodiment of the present disclosure is to produce a heat exchanger core 10, including a core body formation step S1 of forming a core body 13 including a plurality of axial passages 3 extending along the axial direction D1 by additive manufacturing, and a header formation step S3 of forming a header 11 adjacent to at least one end portion of the core body 13 in the axial direction D1 and having a header passage 6 communicating with the plurality of axial passages 3 by additive manufacturing.

The header formation step S3 includes forming the header passage 6 so as to include at least one radial passage 61 extending along the radial direction, and a plurality of circumferential passages 66 branched from any radial passage 61 and communicating with one or more axial passages 3, respectively. The header formation step S3 includes forming each radial passage 61 such that the flow passage area Ca2 in the second position P2 radially inward of the first position P1 is smaller than the flow passage area Ca1 in the first position P1.

According to the above method (16), since the heat exchanger core 10 can be integrally formed by additive manufacturing, it is not necessary to assemble components or seal the components with a gasket. Thus, it is possible to significantly reduce the maintenance work.

(17) A method of producing a heat exchanger core 10 according to at least one embodiment of the present disclosure is to produce a heat exchanger core 10, including a core body formation step S1 of forming a core body 13 including a plurality of axial passages 3 extending along the axial direction D1 by additive manufacturing, and a header formation step S3 of forming a header 11 adjacent to at least one end portion of the core body 13 in the axial direction D1 and having a header passage 6 communicating with the plurality of axial passages 3 by additive manufacturing.

The header formation step S3 includes forming the header passage 6 so as to include at least one radial passage 61 extending along the radial direction, and a plurality of circumferential passages 66 branched from any radial passage 61 and communicating with one or more axial passages 3, respectively. The header formation step S3 includes forming the header 11 such that at least one opening 63 is formed by the at least one radial passage 61 on the outer peripheral surface of the heat exchanger core 10 in the header 11, and the opening dimension AL1 along the axial direction D1 of each opening 63 is one or more times the opening dimension AL2 along the circumferential direction D2 of each opening 63.

According to the above method (17), since the heat exchanger core 10 can be integrally formed by additive manufacturing, it is not necessary to assemble components or seal the components with a gasket. Thus, it is possible to significantly reduce the maintenance work.

Modified Example of Radial Passage and Circumferential Passage

A modified example of the radial passage 61 and the circumferential passage 66 will now be described.

Figure 13:
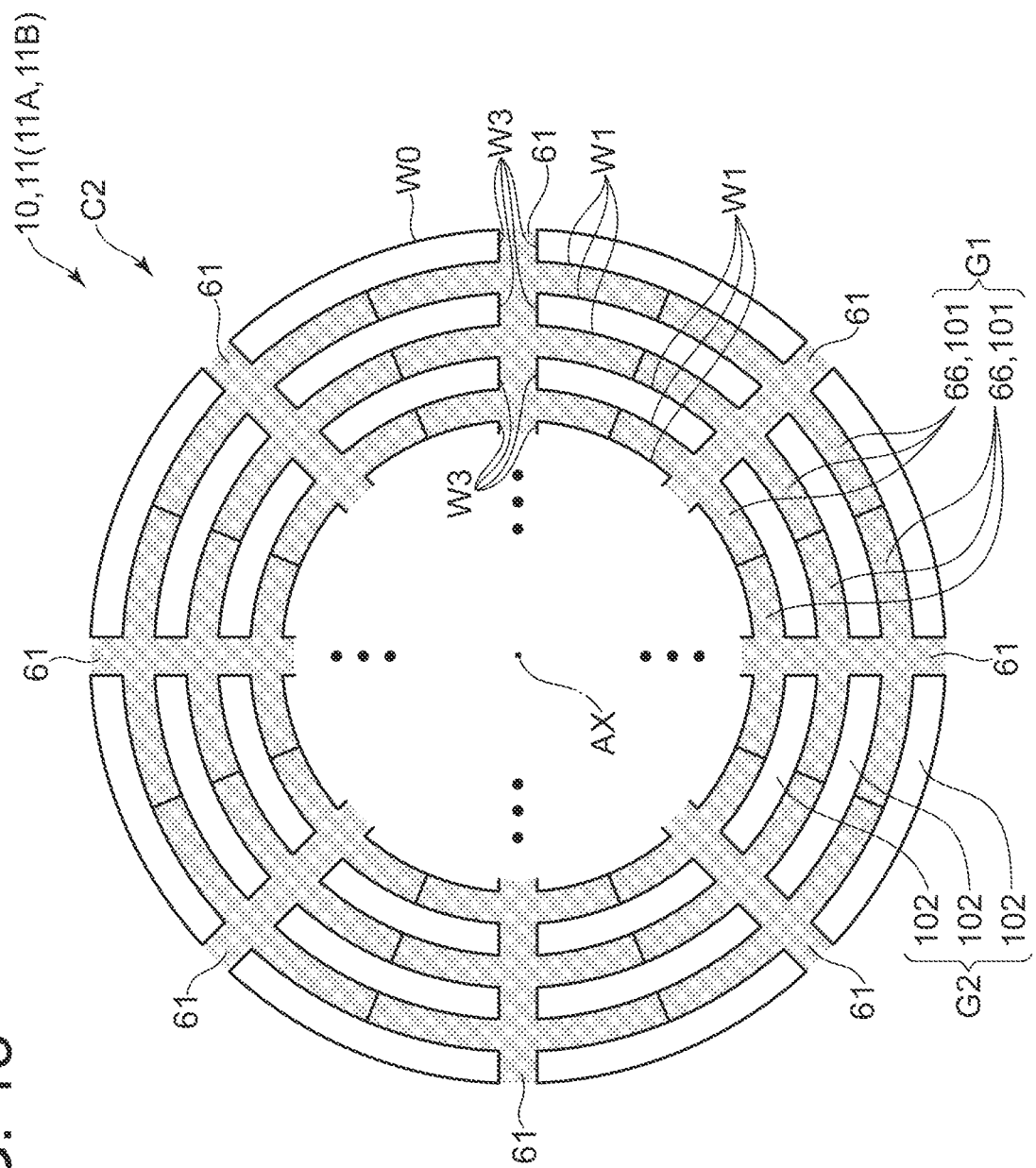
FIG. 13 is a cross-sectional view taken along line IV-IV in FIG. 2 in a modified example of the radial passage and the circumferential passage.

FIG. 13 is a cross-sectional view taken along line IV-IV in FIG. 2 in a modified example of the radial passage and the circumferential passage.

Figure 14:
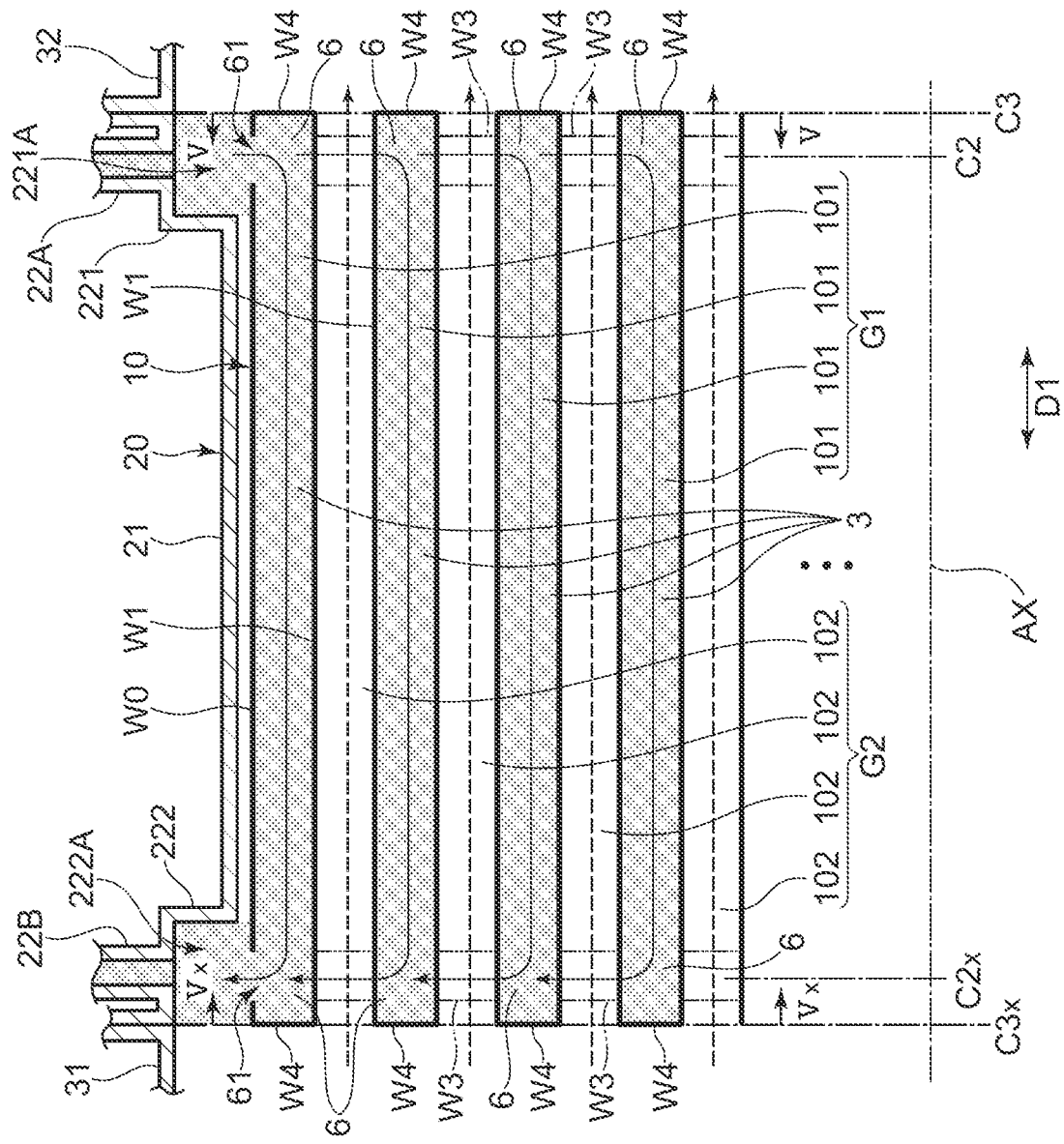
FIG. 14 is a schematic diagram showing the respective flows of the first fluid and the second fluid in a modified example of the radial passage and the circumferential passage.

FIG. 14 is a schematic diagram showing the respective flows of the first fluid and the second fluid in a modified example of the radial passage and the circumferential passage.

Figure 15A:
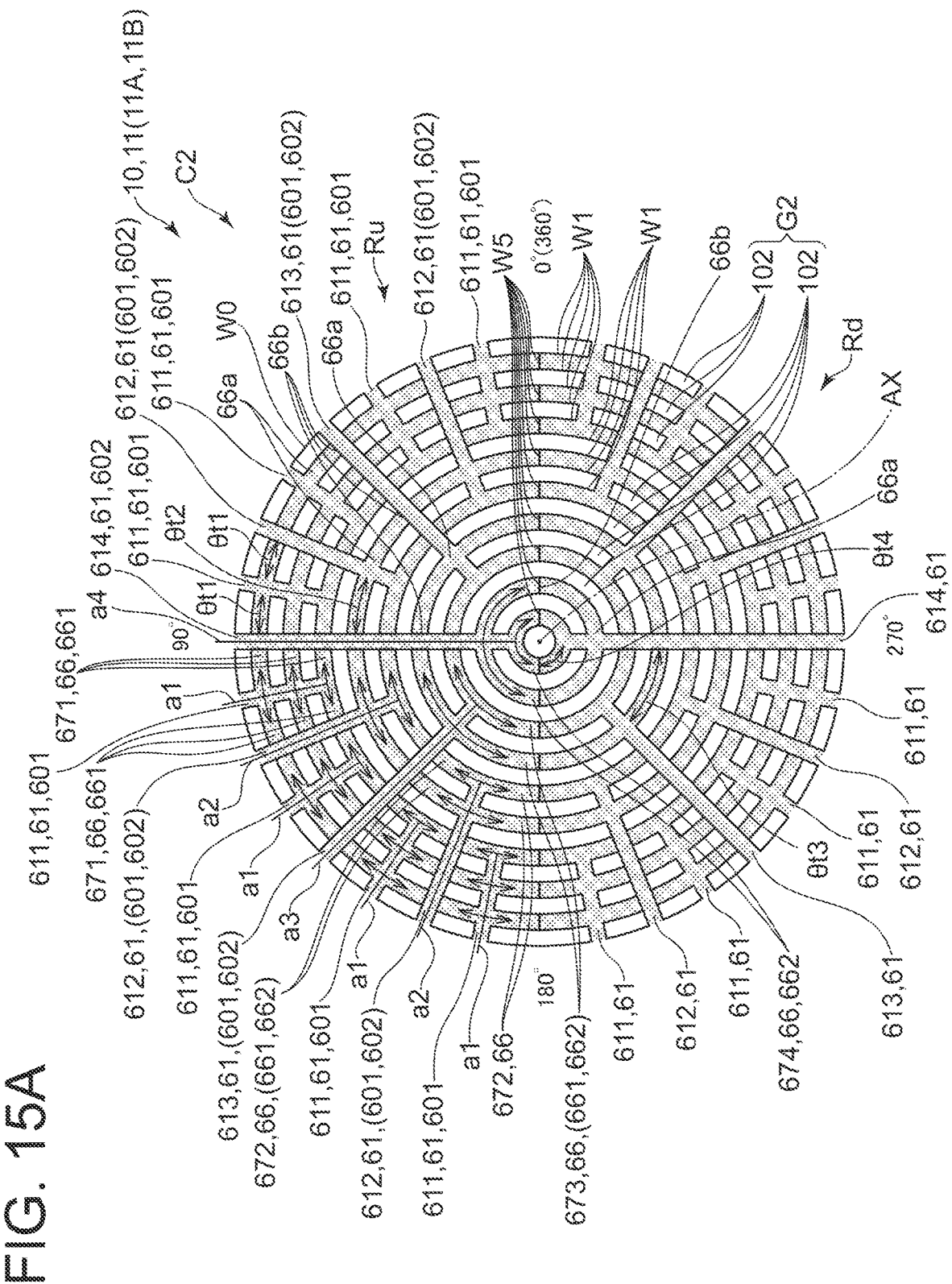
FIG. 15A is a schematic diagram for describing the radial passage and the circumferential passage according to an embodiment in a modified example of the radial passage and the circumferential passage.

FIG. 15A is a schematic diagram for describing the radial passage and the circumferential passage according to an embodiment in a modified example of the radial passage and the circumferential passage, showing the second transverse cross-section C2.

Figure 15B:
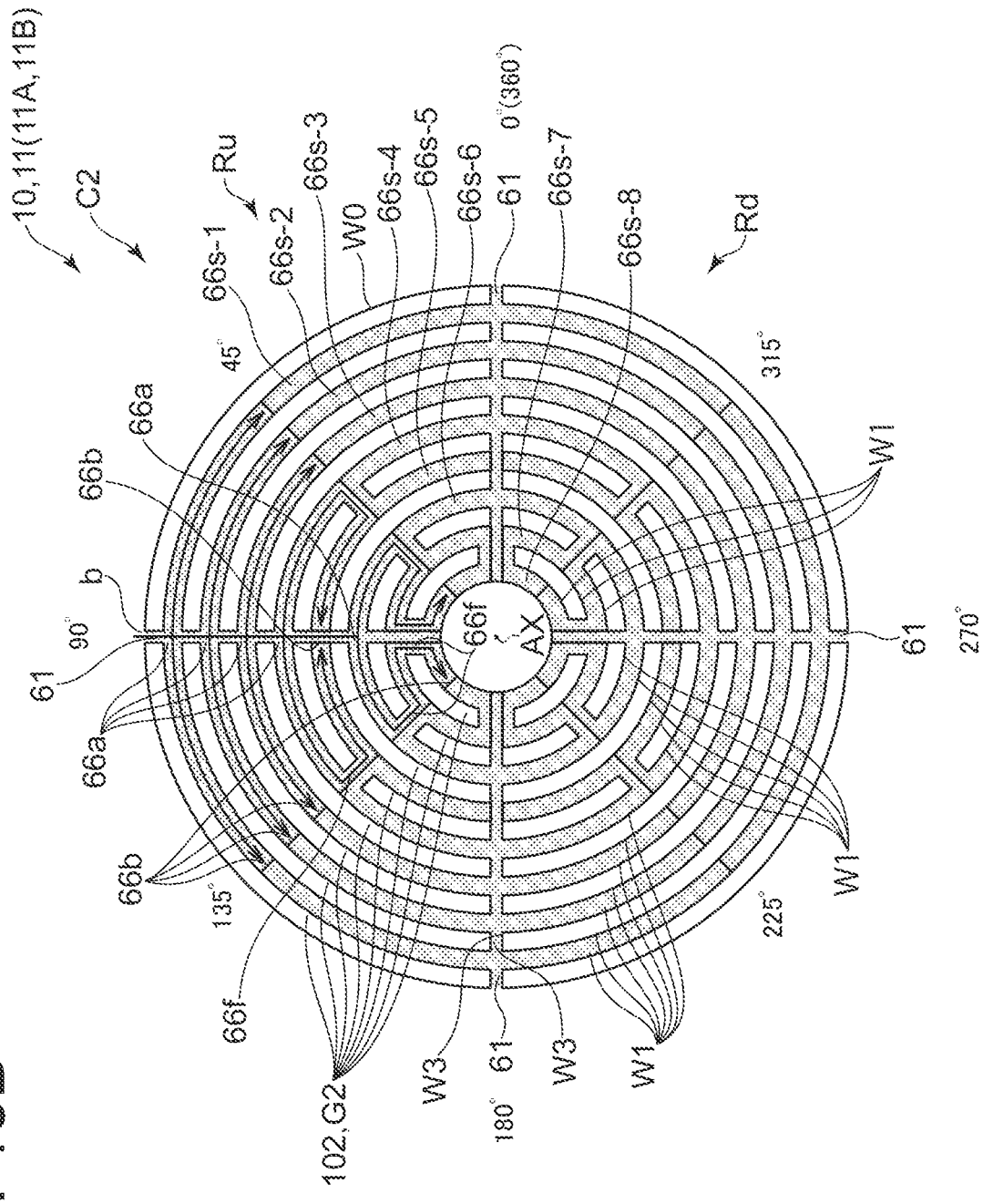
FIG. 15B is a schematic diagram for describing the radial passage and the circumferential passage according to another embodiment in a modified example of the radial passage and the circumferential passage.

FIG. 15B is a schematic diagram for describing the radial passage and the circumferential passage according to another embodiment in a modified example of the radial passage and the circumferential passage, showing the second transverse cross-section C2.

Figure 16:
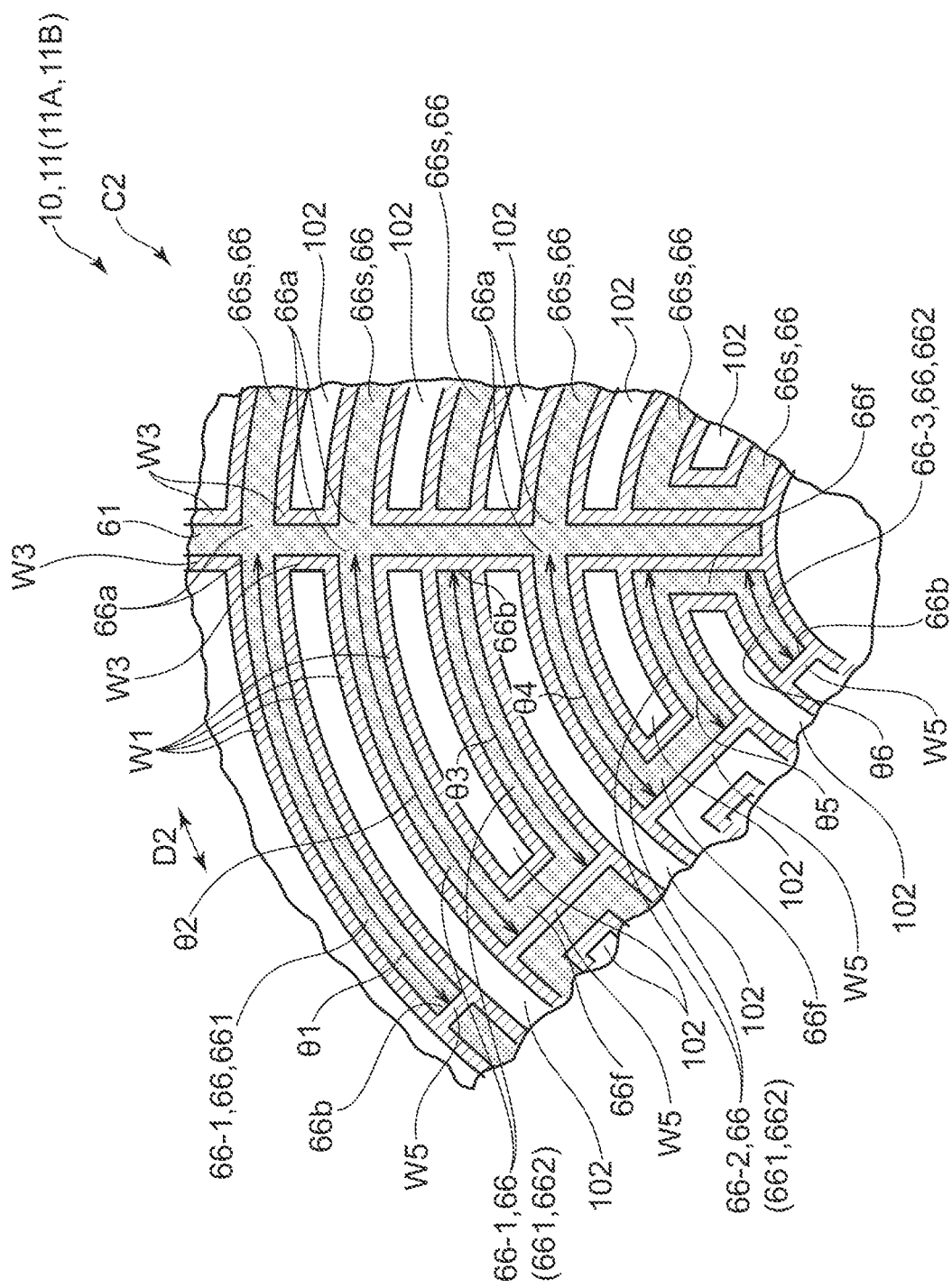
FIG. 16 is a schematic diagram for describing the total angular range.

FIG. 16 is a schematic diagram for describing the total angular range, corresponding to the diagram showing a portion of the second transverse cross-section C2. In FIG. 16, the second transverse cross-section C2 in the other embodiment shown in FIG. 15B is partially enlarged.

In some embodiments in the modified example of the radial passage 61 and the circumferential passage 66, as shown in FIG. 13, the radial passages 61 distributed in the circumferential direction D2 preferably have the same flow passage cross-sectional area. In this case, the length of the section in which the first fluid and the second fluid flow in countercurrent along the axial direction D1 can be kept uniform in the circumferential direction D2 of the first passages 101 and the second passages 102. Tolerances for the flow passage cross-sectional area in each radial passage 61 are allowed.

The shape of the transverse cross-section of each radial passage 61 and the shape of the opening in the side wall W0 are rectangular in the example shown in FIGS. 1 and 2, but it may be any other shape such as a circular shape, as appropriate.

The axes of the crossing walls W3 are on the same straight line.

In the heat exchanger core 10 according to some embodiments in the modified example of the radial passage 61 and the circumferential passage 66, since the first header 11A and the second header 11B have the same structure, in the following description, without distinguishing between the first header 11A and the second header 11B, they will be referred to simply as the header 11 without the alphabetical letters A and B.

As shown in FIGS. 15A and 15B, in the header 11 according to some embodiments in the modified example of the radial passage 61 and the circumferential passage 66, the header passage 6 includes at least one radial passage 61 extending along the radial direction. In the header 11 according to some embodiments in the modified example, the header passage 6 includes a plurality of circumferential passages 66 branched from any radial passage 61 and communicating with one or more axial passages 3, respectively. The circumferential passages 66 according to some embodiments in the modified example are first passages 101 that extend along the circumferential direction and the axial direction in the header 11, among the plurality of first passages 101.

Since the header passage 6 includes the at least one radial passage 61 and the plurality of circumferential passages 66 branched from any radial passage 61 and communicating with one or more axial passages 3, the header 11 can be relatively downsized.

In the heat exchanger 1 according to some embodiments in the modified example, the header passage 6 causes the first fluid entering the radial passage 61 along the radial passage to flow through the circumferential passages 66 in the circumferential direction and turn to the axial direction so that the first fluid is distributed to the first passages arranged in the core body 13. Further, in the heat exchanger 1 according to some embodiments in the modified example, the flow of the first fluid flowing along the axial direction in the core body 13 is turned to the radial direction in the process of flowing through the circumferential passages 66 and the radial passage 61. Therefore, the flow rate of the fluid flowing in the core body 13 may vary with the position in the circumferential direction or the radial direction, and the heat exchange efficiency may decrease due to such a difference in the flow rate.

The heat exchanger 1 according to some embodiments in the modified example has the following configuration to suppress the difference in the flow rate of the first fluid while suppressing the volume expansion of the header 11. Hereinafter, the configuration to suppress the difference in the flow rate of the first fluid while suppressing the volume expansion of the header 11 will be described sequentially.

For example, as is well shown in FIG. 16, in the heat exchanger 1 according to some embodiments in the modified example, the circumferential passage 66 extends from one end 66a, which is an open end connected to the radial passage, to the other end 66b, which is a closed end.

In the following description, the length along the circumferential direction from one end 66a to the other end 66b of the circumferential passage 66 is referred to as a passage length Lc.

Further, in the following description, each layer of the circumferential passages 66 arranged layer by layer along the radial direction is also referred to as a segment passage 66s.

In the following description, the sum of the angular ranges around the radial center position (axis AX) when the circumferential passage 66 is traced from one end 66a to the other end 66b is referred to as a total angular range θt. That is, the total angular range θt is an integrated value of the change amount of the angle around the radial center position (axis AX) when the circumferential passage 66 is traced from one end 66a to the other end 66b. The total angular range θt is the sum of the angular ranges in which the individual segment passages 66s included in one circumferential passage 66 extend, as will be described later.

An outermost circumferential passage 66-1 shown in FIG. 16 is composed of an outermost segment passage 66s shown in FIG. 16. Accordingly, the total angular range θt of the outermost circumferential passage 66-1 is the angular range θ1 of the outermost segment passage 66s shown in FIG. 16.

For example, a circumferential passage 66-2 adjacent to the radially inner side of the outermost circumferential passage 66-1 shown in FIG. 16 is composed of a second layer segment passage 66s and a third layer segment passage 66s counting from the outermost segment passage 66s shown in FIG. 16. Specifically, in the circumferential passage 66-2, an end portion of the second layer segment passage 66s on the opposite side from one end 66a is connected along the radial direction to an end portion of the third layer segment passage 66s. The circumferential passage 66-2 is formed by the second layer segment passage 66s and the third layer segment passage 66s as one circumferential passage 66.

Accordingly, the total angular range θt of the circumferential passage 66-2 is the sum of the angular range θ2 of the second layer segment passage 66s and the angular range θ3 of the third layer segment passage 66s.

Further, in the example shown in FIG. 16, a circumferential passage 66-3 is composed of a fourth layer segment passage 66s, a fifth layer segment passage 66s, and a sixth layer segment passage 66s counting from the outermost segment passage 66s shown in FIG. 16. Specifically, in the circumferential passage 66-3, an end portion of the fourth layer segment passage 66s on the opposite side from one end 66a is connected along the radial direction to an end portion of the fifth layer segment passage 66s. In the circumferential passage 66-3, an end portion of the fifth layer segment passage 66s on the same side as one end 66a is connected along the radial direction to an end portion of the sixth layer segment passage 66s.

Accordingly, the total angular range θt of the circumferential passage 66-3 is the sum of the angular range θ4 of the fourth layer segment passage 66s, the angular range θ5 of the fifth layer segment passage 66s, and the angular range θ6 of the sixth layer segment passage 66s.

The connecting portion between the segment passages 66s adjacent to each other in the radial direction is referred to as a folded portion 66f. Further, the number of folded portions 66f in one circumferential passage 66 is referred to as the number of folds.

The circumferential passage 66 having the folded portion 66f will be described in detail later.

In the outermost circumferential passage 66 shown in FIG. 16, which does not have the folded portion 66f, the number of folds is zero.

Here, consider a circumferential passage 66 referred to as a first circumferential passage 661, and a circumferential passage 66 disposed radially inward of the first circumferential passage 661 and referred to as a second circumferential passage 662.

For convenience of explanation, the passage length Lc of the first circumferential passage 661 along the circumferential direction is referred to as a first passage length L1, and the passage length Lc of the second circumferential passage 662 along the circumferential direction is referred to as a second passage length L2.

For example, in the range shown in FIG. 16, in the relationship between the outermost circumferential passage 66-1 and the other circumferential passages 66-2 and 66-3, the outermost circumferential passage 66-1 corresponds to the first circumferential passage 661, while the other circumferential passages 66-2 and 66-3 correspond to the second circumferential passage 662.

Further, for example, in the relationship between the innermost circumferential passage 66-3 in the range shown in FIG. 16 and the other circumferential passages 66-1 and 66-2, the innermost circumferential passage 66-3 corresponds to the second circumferential passage 662, while the other circumferential passages 66-1 and 66-2 correspond to the first circumferential passage 661.

In the case of including a not-shown circumferential passage existing radially outward of the outermost circumferential passage 66-1 in the range shown in FIG. 16, in the relationship between, on one hand, the not-shown circumferential passage and the outermost circumferential passage 66-1 and, on the other hand, the other circumferential passages 66-2 and 66-3, the not-shown circumferential passage and the outermost circumferential passage 66-1 correspond to the first circumferential passage 661, and the other circumferential passages 66-2 and 66-3 correspond to the second circumferential passage 662.

The first circumferential passage 661 and the second circumferential passage 662 have been described above with reference to FIG. 16, but the same applies to each circumferential passage 66 according to not only the other embodiment shown in FIG. 15B but also the embodiment shown in FIG. 15A.

Even with the same total angle range θt, due to the difference in radial position, the first passage length L1 of the first circumferential passage 661 is longer than the second passage length L2 of the second circumferential passage 662. Thus, if the passage width (width in the radial direction) is the same, the pressure loss is larger in the first circumferential passage 661 than the second circumferential passage 662, making it difficult for the first fluid to flow.

In view of this, in the heat exchanger core 10 according to some embodiments in the modified example, the lengths are equalized between the circumferential passages 66 to suppress the deviation of the flow rate in the axial passages 3. Specifically, in the heat exchanger core 10 according to some embodiments in the modified example, the deviation of the passage length Lc of the circumferential passages 66 is suppressed to prevent the flow rate of the first fluid flowing from the circumferential passages 66 into the axial passages 3 and from the axial passages 3 into the circumferential passages 66 from varying with the individual circumferential passages 66.

More specifically, in the heat exchanger core 10 according to some embodiments in the modified example, as described later, the plurality of circumferential passages 66 is configured so as to include the first circumferential passage 661, and the second circumferential passage 662 disposed radially inward of the first circumferential passage 661 and arranged in the circumferential direction over the total angular range θt larger than that of the first circumferential passage 661.

That is, in the heat exchanger core 10 according to some embodiments in the modified example, as described later, the total angular range θt of the first circumferential passage 661 is smaller than the total angular range θt of the second circumferential passage 662.

With this configuration, as compared to the case where the total angle range θt is the same between the first circumferential passage 661 and the second circumferential passage 662, the difference between the first passage length L1 and the second passage length L2 can be suppressed. This prevents the pressure loss of the first circumferential passage 661 from becoming larger than that of the second circumferential passage 662, thus suppressing the difference in the flow velocity between the first circumferential passage 661 and the second circumferential passage 662. As a result, the difference between the flow rate of the first fluid in the axial passage 3 connected to the first circumferential passage 661 and the flow rate of the first fluid in the axial passage 3 connected to the second circumferential passage 662 can be suppressed, and the heat exchange efficiency of the heat exchanger core 10 can be improved.

Radial Passages in Header According to One Embodiment in Modified Example

The radial passages 61 in the header 11 according to the embodiment shown in FIG. 15A will now be mainly described. For convenience of explanation, we will also discuss the circumferential passages 66 if they should be explained in relation to the radial passages 61.

In the header 11 according to the embodiment shown in FIG. 15A, multiple radial passages 61 with different radial lengths are arranged at intervals in the circumferential direction. More specifically, the header 11 according to the embodiment shown in FIG. 15A is provided with multiple types of radial passages 61 having different radial lengths from the side wall W0 to the radially inner end. The radial passages 61 according to the embodiment shown in FIG. 15A include a first type radial passage 611 having the shortest radial length, a second type radial passage 612 having the second shortest radial length, a third type radial passage 613 having the third shortest radial length, and a fourth type radial passage 614 having the fourth shortest radial length (the longest radial length).

In the header 11 according to the embodiment shown in FIG. 15A, the folded portion 66f is not provided in the circumferential passage 66.

In the radial passages 61 according to the embodiment in the modified example, regardless of the type of the radial passage 611, 612, 613, or 614, the radially outer ends of all the radial passage 61 are located at the side wall W0.

The radial passages 61 according to the embodiment in the modified example are not limited to the example shown in FIG. 15A, as long as they include at least two types of radial passages 61 having different radial lengths. The radial passages 61 according to the embodiment in the modified example are not limited to the example shown in FIG. 15A, but may include five types of radial passages 61 having different radial lengths.

Thus, the header 11 according to the embodiment shown in FIG. 15A has a stepped radial passages group composed of multiple radial passages 61 with different radial positions of radially inner ends.

Herein, when two types of radial passages 61 having different radial lengths are described, the radial passage 61 having the shorter radial length is also referred to as a first radial passage 601, and the radial passage 61 having the longer radial length is also referred to as a second radial passage 602.

For example, when the first type radial passage 611 having the shortest radial length and the second type radial passage 612 having the second shortest radial length are described, the first type radial passage 611 corresponds to the first radial passage 601, and the second type radial passage 612 having the second shortest radial length corresponds to the second radial passage 602.

Similarly, when the second type radial passage 612 having the second shortest radial length and the fourth type radial passage 614 having the fourth shortest radial length are described, the second type radial passage 612 corresponds to the first radial passage 601, and the fourth type radial passage 614 corresponds to the second radial passage 602.

The first type radial passage 611 having the shortest radial length always corresponds to the first radial passage 601 when compared with any other type of radial passages 612, 613, 614. Further, the fourth type radial passage 614 having the fourth shortest radial length (longest radial length) always corresponds to the second radial passage 602 when compared with any other type of radial passages 611, 612, 613. The second type radial passage 612 having the second shortest radial length and the third type radial passage 613 having the third shortest radial length can correspond to, depending on the type of the radial passage 61 to be compared, the first radial passage 601 or the second radial passage 602.

In the header 11 according to the embodiment shown in FIG. 15A, each radial passage 61 communicates with all or some of the circumferential passages 66 adjacent to itself on one side and the other side in the circumferential direction.

For example, the first type radial passage 611 according to the embodiment in the modified example communicates with all of the circumferential passages 66 adjacent to itself on one side and the other side in the circumferential direction. The circumferential passage 66 communicating with the first type radial passage 611 is referred to as a first type circumferential passage 671.

For example, the second type radial passage 612 according to the embodiment in the modified example communicates with all of the circumferential passages 66 adjacent to itself on one side and the other side in the circumferential direction, only in a range radially inward of the radial range occupied by the first type radial passage 611. In other words, the second type radial passage 612 according to the embodiment in the modified example does not communicate with the circumferentially adjacent circumferential passages 66 in the radial range occupied by the first type radial passage 611. The circumferential passage 66 communicating with the second type radial passage 612 is referred to as a second type circumferential passage 672.

For example, the third type radial passage 613 according to the embodiment in the modified example communicates with all of the circumferential passages 66 adjacent to itself on one side and the other side in the circumferential direction only in a range radially inward of the radial range occupied by the second type radial passage 612. In other words, the third type radial passage 613 according to the embodiment in the modified example does not communicate with the circumferentially adjacent circumferential passages 66 in the radial range occupied by the second type radial passage 612. The circumferential passage 66 communicating with the third type radial passage 613 is referred to as a third type circumferential passage 673.

For example, the fourth type radial passage 614 according to the embodiment in the modified example communicates with all of the circumferential passages 66 adjacent to itself on one side and the other side in the circumferential direction only in a range radially inward of the radial range occupied by the third type radial passage 613. In other words, the fourth type radial passage 614 according to the embodiment in the modified example does not communicate with the circumferentially adjacent circumferential passages 66 in the radial range occupied by the third type radial passage 613. The circumferential passage 66 communicating with the fourth type radial passage 614 is referred to as a fourth type circumferential passage 674.

In the header 11 according to the embodiment shown in FIG. 15A, the first fluid entering the inside of the first inlet header 221 through the inlet port 22A flows from the first type radial passage 611 to the first type circumferential passages 671, as shown by the arrow a1. In each first type circumferential passage 671, the first fluid flows along the axial direction toward the axial passage 3 while flowing along the circumferential direction from one end 66a to the other end 66b.

Similarly, the first fluid entering the inside of the first inlet header 221 through the inlet port 22A flows from the second type radial passage 612 to the second type circumferential passages 672, as shown by the arrow a2. In each second type circumferential passage 672, the first fluid flows along the axial direction toward the axial passage 3 while flowing along the circumferential direction from one end 66a to the other end 66b.

The first fluid entering the inside of the first inlet header 221 through the inlet port 22A flows from the third type radial passage 613 to the third type circumferential passages 673, as shown by the arrow a3. In each third type circumferential passage 673, the first fluid flows along the axial direction toward the axial passage 3 while flowing along the circumferential direction from one end 66a to the other end 66b.

The first fluid entering the inside of the first inlet header 221 through the inlet port 22A flows from the fourth type radial passage 614 to the fourth type circumferential passages 674, as shown by the arrow a4. In each fourth type circumferential passage 674, the first fluid flows along the axial direction toward the axial passage 3 while flowing along the circumferential direction from one end 66a to the other end 66b.

For example, in the embodiment shown in FIG. 15A, in the relationship between the first type circumferential passage 671 and the other type circumferential passages 672, 673, and 674, the first type circumferential passage 671 corresponds to the first circumferential passage 661, while the other type circumferential passages 672, 673, and 674 correspond to the second circumferential passage 662.

Further, for example, in the embodiment shown in FIG. 15A, in the relationship between, on one hand, the first type circumferential passage 671 and the second type circumferential passage 672 and, on the other hand, the third type circumferential passage 673 and the fourth type circumferential passage 674, the first type circumferential passage 671 and the second type circumferential passage 672 correspond to the first circumferential passage 661, while the third type circumferential passage 673 and the fourth type circumferential passage 674 correspond to the second circumferential passage 662.

For example, in the embodiment shown in FIG. 15A, in the relationship between the fourth type circumferential passage 674 and the other type circumferential passages 671, 672, and 673, the fourth type circumferential passage 674 corresponds to the second circumferential passage 662, while the other type circumferential passages 671, 672, and 673 correspond to the first circumferential passage 661.

That is, in the embodiment shown in FIG. 15A, the radial passage 61 includes the first radial passage 601 and the second radial passage 602. The first radial passage 601 communicates with the first circumferential passage 661. The second radial passage 602 is disposed over the radial range occupied by the first radial passage 601 and a range radially inward of the radial range and communicates with the second circumferential passage 662.

Further, in the embodiment shown in FIG. 15A, the first radial passage 601 does not communicate with the second circumferential passage 662, and the second radial passage 602 does not communicate with the first circumferential passage 661.

In FIG. 15A, for convenience of explaining the arrangement position of each radial passage 61 in the circumferential direction, the angle about the axis AX is defined as follows.

In the embodiment shown in FIG. 15A, for example, two fourth type radial passages 614 having the fourth shortest radial length (the longest radial length) are positioned 180 degrees apart from each other with the axis AX interposed therebetween. One of the two fourth type radial passages 614 is positioned at an angular position of 90 degrees, and the other is positioned at an angular position of 270 degrees.

Further, in FIG. 15A, the upper side in the figure is an angular position of 90 degrees, the lower side in the figure is an angular position of 270 degrees, the right side in the figure is an angular position of 0 degrees, and the left side in the figure is an angular position of 180 degrees.

In the embodiment shown in FIG. 15A, partition walls (second partition wall) W5 are formed at angular positions of 0 degrees and 180 degrees. At angle positions of 0 degrees and 180 degrees, each second partition wall W5 separates the circumferential passage 66 into sections which lie on opposites sides of the second partition wall W5 in the circumferential direction.

Further, although not depicted, the second partition wall W5 may further separate the second passage 102 into sections which lie on opposites side of the second partition wall W5.

In the embodiment shown in FIG. 15A, an angular region of 0 to 180 degrees, which is the region on one side of the second partition wall W5, is also referred to as an upper half region Ru, and an angular region of 180 to 360 degrees, which is the region on the other side of the second partition wall W5, is also referred to as a lower half region Rd.

In the embodiment shown in FIG. 15A, the upper half region Ru and the lower half region Rd may be formed so as to be symmetrical with respect to the second partition wall W5.

In the embodiment shown in FIG. 15A, in each of the upper half region Ru and the lower half region Rd, the other types of radial passages 61 except the fourth type radial passage 614 are arranged at an even pitch along the circumferential direction for each type of the radial passage 61. Further, in the embodiment shown in FIG. 15A, the arrangement pitches along the circumferential direction between any two radial passages 61 adjacent to each other in the circumferential direction are the same.

In the embodiment shown in FIG. 15A, as described above, one of the two fourth type radial passages 614 is positioned at an angular position of 90 degrees, and the other is positioned at an angular position of 270 degrees, so that they are arranged at an even pitch along the circumferential direction.

That is, in the embodiment shown in FIG. 15A, two or more first radial passages 601 are arranged at an even pitch along the circumferential direction. Two or more second radial passages 602 are arranged at an even pitch along the circumferential direction.

With this configuration, as compared to the case where the first radial passages 601 are arranged at an uneven pitch, it is possible to suppress the difference in the passage length of the circumferential passage 66 due to the connected first radial passage 601 and prevent the flow rate from varying with the individual circumferential passage 66. Similarly, as compared to the case where the second radial passages 602 are arranged at an uneven pitch, it is possible to suppress the difference in the passage length of the circumferential passage 66 due to the connected second radial passage 602 and prevent the flow rate from varying with the individual circumferential passage 66. Thus, it is possible to suppress a decrease in the heat exchange efficiency.

Further, the arrangement at an even pitch allows for efficient arrangement of the radial passages 61 and suppresses the number of radial passages 61. As a result, the proportion of the region occupied by the radial passages 61 in the cross-section (second transverse cross-section C2) of the header 11 when viewed from the axial direction can be decreased, and the proportion of the region occupied by the circumferential passages 66 can be increased.

In the embodiment shown in FIG. 15A, the shorter the radial length, the larger the arrangement number. Specifically, in the embodiment shown in FIG. 15A, sixteen first type radial passages 611, eight second type radial passages 612, four third type radial passages 613, and two fourth type radial passages 614 are disposed. Accordingly, in the embodiment shown in FIG. 15A, the shorter the radial length, the smaller the arrangement pitch of the radial passages 61 along the circumferential direction.

That is, in the embodiment shown in FIG. 15A, the number of first radial passages 601 is larger than the number of second radial passages 602.

With this configuration, as compared to the case where the number of first radial passages 601 is smaller than the number of second radial passages 602, the distance between two first radial passages 601 adjacent to each other in the circumferential direction can be reduced along the circumferential direction, so that the first passage length L1 of the first circumferential passage 661 can be suppressed. As a result, the difference between the first passage length L1 of the first circumferential passage 661 and the second passage length L2 of the second circumferential passage 662 can be suppressed. This suppresses the difference in pressure loss between the second circumferential passage 662 and the first circumferential passage 661, thus suppressing the difference in the flow velocity between the first circumferential passage 661 and the second circumferential passage 662.

Circumferential Passages in Header According to One Embodiment in Modified Example The circumferential passages 66 in the header 11 according to the embodiment shown in FIG. 15A will now be mainly described with respect to the points not mentioned in the above description.

In the header 11 according to the embodiment shown in FIG. 15A, as described above, each circumferential passage 66 is connected at one end 66a, which is an open end, to any radial passage 61. Each circumferential passage 66 according to the embodiment shown in FIG. 15A is separated at the other end 66b from another radial passage 61 different from the connected radial passage 61 by the crossing wall W3 of the other radial passage 61, or separated from another circumferentially adjacent circumferential passage 66 by the second partition wall W5.

In the embodiment shown in FIG. 15A, for example, focusing on the first type radial passage 611 having the shortest radial length and the second type radial passage 612 having the second shortest radial length, as described above, the first type radial passage 611 corresponds to the first radial passage 601, and the second type radial passage 612 having the second shortest radial length corresponds to the second radial passage 602. In this case, focusing on the first type circumferential passage 671 communicating with the first type radial passage 611 and the second type circumferential passage 672 communicating with the second type radial passage 612, the first type circumferential passage 671 corresponds to the first circumferential passage 661, and the second type circumferential passage 672 corresponds to the second circumferential passage 662.

Similarly, focusing on the second type radial passage 612 having the second shortest radial length and the fourth type radial passage 614 having the fourth shortest radial length, as described above, the second type radial passage 612 corresponds to the first radial passage 601, and the fourth type radial passage 614 corresponds to the second radial passage 602. In this case, focusing on the second type circumferential passage 672 communicating with the second type radial passage 612 and the fourth type circumferential passage 674 communicating with the fourth type radial passage 614, the second type circumferential passage 672 corresponds to the first circumferential passage 661, and the fourth type circumferential passage 674 corresponds to the second circumferential passage 662.

In the embodiment shown in FIG. 15A, for example, focusing on the first type radial passage 611 and the second type radial passage 612 adjacent to each other in the circumferential direction, the total angular range $\theta t2$ of the second type circumferential passage 672 communicating with the second type radial passage 612 is larger than the total angular range $\theta t1$ of the first type circumferential passage 671 communicating with the first type radial passage 611.

In the embodiment shown in FIG. 15A, for example, focusing on the second type radial passage 612 and the third type radial passage 613 adjacent to each other in the circumferential direction, the total angular range $\theta t3$ of the third type circumferential passage 673 communicating with the third type radial passage 613 is larger than the total angular range $\theta t2$ of the second type circumferential passage 672 communicating with the second type radial passage 612.

In the embodiment shown in FIG. 15A, for example, focusing on the third type radial passage 613 and the fourth type radial passage 614 adjacent to each other in the circumferential direction, the total angular range $\theta t4$ of the fourth type circumferential passage 674 communicating with the fourth type radial passage 614 is larger than the total angular range $\theta t3$ of the third type circumferential passage 673 communicating with the third type radial passage 613.

That is, in the embodiment shown in FIG. 15A, the total angular range $\theta t$ of the second circumferential passage 662 is larger than the total angular range $\theta t$ of the first circumferential passage 661.

In the embodiment shown in FIG. 15A, for example, in the circumferential direction, the second type circumferential passage 672 extends from the second type radial passage 612 past the first type radial passage 611 to the opposite side of the first type radial passage 611.

Similarly, in the embodiment shown in FIG. 15A, for example, in the circumferential direction, the third type circumferential passage 673 extends from the third type radial passage 613 past the second type radial passage 612 to the opposite side of the second type radial passage 612.

Further, in the embodiment shown in FIG. 15A, in the circumferential direction, the fourth type circumferential passage 674 extends from the fourth type radial passage 614 past the third type radial passage 613 to the opposite side of the third type radial passage 613.

That is, in the embodiment shown in FIG. 15A, in the circumferential direction, the second circumferential passage 662 extends from the second radial passage 602 past the first radial passage 601 to the opposite side of the first radial passage 601.

With this configuration, the total angular range $\theta t$ of the second circumferential passage 662 can be made larger than that of the first circumferential passage 661 without complicating the shape of the first circumferential passage 661 and the second circumferential passage 662, thus suppressing the difference in the flow velocity between the first circumferential passage 661 and the second circumferential passage 662.

In the embodiment shown in FIG. 15A, as described above, the first radial passage 601 does not communicate with the second circumferential passage 662, and the second radial passage 602 does not communicate with the first circumferential passage 661.

Thus, when the first fluid flows from the first radial passage 601 to the first circumferential passage 661, all the first fluid from the first radial passage 601 can be supplied to the first circumferential passage 661. Therefore, an insufficient supply amount of the first fluid to the first circumferential passage 661 can be suppressed, and a decrease in the heat exchange efficiency can be suppressed.

Similarly, when the first fluid flows from the second radial passage 602 to the second circumferential passage 662, all the first fluid from the second radial passage 602 can be supplied to the second circumferential passage 662. Therefore, an insufficient supply amount of the first fluid to the second circumferential passage 662 can be suppressed, and a decrease in the heat exchange efficiency can be suppressed.

Further, when the first fluid flows from the first circumferential passage 661 to the first radial passage 601, since the first fluid from the second circumferential passage 662 does not flow into the first radial passage 601, it is possible to prevent the flow rate of the first fluid flowing through the first radial passage 601 from increasing due to the first fluid from the second circumferential passage 662. As a result, it is possible to suppress an increase in the pressure loss in the first radial passage 601 and suppress a decrease in the flow rate in the first circumferential passage 661 to suppress a decrease in the heat exchange efficiency.

Similarly, when the first fluid flows from the second circumferential passage 662 to the second radial passage 602, since the first fluid from the first circumferential passage 661 does not flow into the second radial passage 602, it is possible to prevent the flow rate of the first fluid flowing through the second radial passage 602 from increasing due to the first fluid from the first circumferential passage 661. As a result, it is possible to suppress an increase in the pressure loss in the second radial passage 602 and suppress a decrease in the flow rate in the second circumferential passage 662 to suppress a decrease in the heat exchange efficiency.

In the embodiment shown in FIG. 15A, as described above, the radial passage 61 is connected to the circumferential passages 66 that are disposed on one side and the other side of the radial passage 61 in the circumferential direction.

With this configuration, as compared to the case where the radial passage 61 is connected to either one of the circumferential passages 66 that are disposed on one side and the other side of the radial passage 61 in the circumferential direction, the number of radial passages 61 can be suppressed. As a result, the proportion of the region occupied by the radial passages 61 in the cross-section of the header 11 when viewed from the axial direction can be decreased, and the proportion of the region occupied by the circumferential passages 66 can be increased.

In the embodiment shown in FIG. 15A, the passage length Lc of the circumferential passage 66 can be adjusted by the number of radial passages 61, the number of variations of the radial length, the radial length of each type, and the arrangement pattern. It is thus desirable to make the difference in the passage length Lc as small as possible.

Radial Passages in Header According to Another Embodiment in Modified Example

The radial passages 61 in the header 11 according to the other embodiment shown in FIG. 15B will now be mainly described, while also referring to FIG. 16.

In the header 11 according to the other embodiment shown in FIG. 15B, multiple radial passages 61 with the same radial length are arranged at intervals in the circumferential direction. More specifically, the header 11 according to the other embodiment shown in FIG. 15B is provided with four radial passages 61 of the same type having the same radial length from the side wall W0 to the radially inner end at an even pitch in the circumferential direction.

Since the radial passages 61 are arranged at an even pitch in the circumferential direction, as compared to the case where the radial passages 61 are arranged at an uneven pitch, it is possible to suppress the difference in the passage length Lc of the circumferential passage 66 due to the connected radial passage 61 and prevent the flow rate from varying with the individual circumferential passage 66.

Further, the arrangement at an even pitch allows for efficient arrangement of the radial passages 61 and suppresses the number of radial passages 61. As a result, the proportion of the region occupied by the radial passages 61 in the cross-section (second transverse cross-section C2) of the header 11 when viewed from the axial direction can be decreased, and the proportion of the region occupied by the circumferential passages 66 can be increased.

In the radial passages 61 according to the other embodiment in the modified example, the radially outer ends of all the radial passages 61 are located at the side wall W0.

The radial passage 61 according to the other embodiment in the modified example communicates with the adjacent circumferential passages 66 on one side and the other side in the circumferential direction at one end 66a of each circumferential passage 66. That is, in the header 11 according to the other embodiment shown in FIG. 15B, the first circumferential passage 661 and the second circumferential passage 662 communicate with the same radial passage 61.

With this configuration, as compared to the case where the first circumferential passage 661 and the second circumferential passage 662 communicate with different radial passages 61, the number of radial passages 61 can be suppressed. As a result, the proportion of the region occupied by the radial passages 61 in the cross-section (second transverse cross-section C2) of the header 11 when viewed from the axial direction can be decreased, and the proportion of the region occupied by the circumferential passages 66 can be increased.

In FIG. 15B, for convenience of explaining the arrangement position of each radial passage 61 in the circumferential direction, the angle about the axis AX is defined as follows.

In the other embodiment shown in FIG. 15B, for example, four radial passages 61 are arranged at 90 degree intervals. The four radial passages 61 are positioned at angular positions of 0 degrees, 90 degrees, 180 degrees, and 270 degrees.

Further, in FIG. 15B, the upper side in the figure is an angular position of 90 degrees, the lower side in the figure is an angular position of 270 degrees, the right side in the figure is an angular position of 0 degrees, and the left side in the figure is an angular position of 180 degrees.

In the other embodiment shown in FIG. 15B, partition walls (second partition wall) W5 are formed at angular positions of 45 degrees, 135 degrees, 225 degrees, and 315 degrees. In the other embodiment shown in FIG. 15B, at the above-described angular positions, each second partition wall W5 separates the circumferential passage 66 into sections which lie on opposites sides of the second partition wall W5 in the circumferential direction.

Further, although not depicted, the second partition wall W5 may further separate the second passage 102 into sections which lie on opposites side of the second partition wall W5.

In the other embodiment shown in FIG. 15B, an angular region of 0 to 180 degrees is also referred to as an upper half region Ru, and an angular region of 180 to 360 degrees is also referred to as a lower half region Rd.

In the embodiment shown in FIG. 15B, the upper half region Ru and the lower half region Rd may be formed so as to be symmetrical with respect to the radial passages 61 disposed at angular positions of 0 degrees and 180 degrees. Further, in the embodiment shown in FIG. 15B, they may be formed so as to be symmetrical with respect to the radial passages 61 disposed at angular positions of 90 degrees and 270 degrees.

Circumferential Passages in Header According to Another Embodiment in Modified Example In the header 11 according to the other embodiment shown in FIG. 15B, as described above, each circumferential passage 66 is connected at one end 66a, which is an open end, to any radial passage 61 (see FIG. 16). Each circumferential passage 66 according to the other embodiment shown in FIG. 15B is separated at the other end 66b from the radial passage 61 by the crossing wall W3 of the radial passage 61, or separated from another circumferentially adjacent circumferential passage 66 by the second partition wall W5.

In the header 11 according to the other embodiment shown in FIG. 15B, among the plurality of circumferential passages 66 arranged along the radial direction, at least the outermost circumferential passage 66 in the radial direction does not have the above-described folded portion 66f. For example, in the header 11 according to the other embodiment shown in FIG. 15B, the first to third circumferential passages 66, in order from the radially outer side along the radial direction, do not have the folded portion 66f.

In the header 11 according to the other embodiment shown in FIG. 15B, the segment passages 66s are referred to as a first segment passage 66s-1, a second segment passage 66s-2, a third segment passage 66s-3, a fourth segment passage 66s-4, a fifth segment passage 66s-5, a sixth segment passage 66s-6, a seventh segment passage 66s-7, and an eighth segment passage 66s-8, in order from the radially outer side along the radial direction.

In the header 11 according to the other embodiment shown in FIG. 15B, each of the first segment passage 66s-1, the second segment passage 66s-2, and the third segment passage 66s-3 individually constitutes one circumferential passage 66. The number of folded portions 66f of these circumferential passages 66 is zero.

Further, in the header 11 according to the other embodiment shown in FIG. 15B, the fourth segment passage 66s-4 and the fifth segment passage 66s-5 are connected by the folded portion 66f, and one circumferential passage 66 is formed by the fourth segment passage 66s-4 and the fifth segment passage 66s-5. The number of folded portions 66f of this circumferential passage 66 is one.

In the header 11 according to the other embodiment shown in FIG. 15B, the sixth segment passage 66s-6 and the seventh segment passage 66s-7 are connected by the folded portion 66f, and the seventh segment passage 66s-7 and the eighth segment passage 66s-8 are connected by the folded portion 66f. Thus, one circumferential passage 66 is formed by the sixth segment passage 66s-6, the seventh segment passage 66s-7, and the eighth segment passage 66s-8. The number of folded portions 66f of this circumferential passage 66 is two.

In the header 11 according to the other embodiment shown in FIG. 15B, the first fluid entering the inside of the first inlet header 221 through the inlet port 22A flows from each radial passage 61 to the circumferential passages 66, as shown by the arrow a1.

In the circumferential passage 66 composed of the first segment passage 66s-1, the circumferential passage 66 composed of the second segment passage 66s-2, and the circumferential passage 66 composed of the third segment passage 66s-3, the first fluid flows along the axial direction toward the axial passage 3 while flowing along the circumferential direction from one end 66a to the other end 66b.

In the circumferential passage 66 composed of the fourth segment passage 66s-4 and the fifth segment passage 66s-5, the first fluid flows along the axial direction toward the axial passage 3 while meandering along the circumferential direction and the radial direction from one end 66a in the fourth segment passage 66s-4 to the other end 66b in the fifth segment passage 66s-5.

In the circumferential passage 66 composed of the sixth segment passage 66s-6, the seventh segment passage 66s-7, and the eighth segment passage 66s-8, the first fluid flows along the axial direction toward the axial passage 3 while meandering along the circumferential direction and the radial direction from one end 66a in the sixth segment passage 66s-6 to the other end 66b in the eighth segment passage 66s-8.

In the header 11 according to the other embodiment shown in FIG. 15B, the circumferential passage 66 on the radially inner side has a larger number of folds. That is, in the header 11 according to the other embodiment shown in FIG. 15B, the second circumferential passage 662 has a larger number of folds than the first circumferential passage 661.

When the second circumferential passage 662 has a larger number of folds than the first circumferential passage 661, the total angular range θt of the second circumferential passage 662 can be increased to secure the second passage length L2. Thus, it is possible to suppress the difference in the flow velocity between the first circumferential passage 661 and the second circumferential passage 662.

In the header 11 according to the other embodiment shown in FIG. 15B, the number of folds is not limited to the example of FIG. 15B, but may be three or more.

In the header 11 according to the other embodiment shown in FIG. 15B, between two radial passages 61 adjacent in the circumferential direction, a second partition wall W5 is formed, which separates in the circumferential direction a plurality of circumferential passages 66 branched from one of the two radial passages 61 and a plurality of circumferential passages 66 branched from the other of the two radial passages 61.

Thus, the circumferential range in which the circumferential passages 66 connected to one radial passage 61 are arranged and the circumferential range in which the circumferential passages 66 connected to the other radial passage 61 are arranged can be defined by the second partition wall W5.

With the heat exchanger 1 equipped with the heat exchanger core 10 according to the above-described embodiments in the modified example of the radial passage 61 and the circumferential passage 66, the heat exchanger 1 can be relatively downsized, and the heat exchange efficiency can be improved.

(Method of Producing Heat Exchanger Core)

Hereinafter, an example of the method of producing the above-described heat exchanger core 10 according to some embodiments in the modified example of the radial passage 61 and the circumferential passage 66 will be described.

In the modified example of the radial passage 61 and the circumferential passage 66, the header formation step S3 includes forming the header passage 6 so as to include at least one radial passage 61 extending along the radial direction, and a plurality of circumferential passages 66 branched from any radial passage 61 and communicating with one or more axial passages 3, respectively.

Further, in the modified example of the radial passage 61 and the circumferential passage 66, the header formation step S3 includes forming the plurality of circumferential passages 66 so as to include a first circumferential passage 661, and a second circumferential passage 662 disposed radially inward of the first circumferential passage 661 and arranged in the circumferential direction over the total angular range θt larger than that of the first circumferential passage 661.

Thus, since the heat exchanger core 10 can be integrally formed by additive manufacturing, it is not necessary to assemble components or seal the components with a gasket. Thus, it is possible to significantly reduce the maintenance work.

The present disclosure is not limited to the embodiments described above in the modified example of the radial passage 61 and the circumferential passage 66, but includes modifications to the embodiments described above, and embodiments composed of combinations of those embodiments in the modified example of the radial passage 61 and the circumferential passage 66.

The contents described in the above embodiments would be understood as follows, for instance.

(18) A heat exchanger core 10 according to at least one embodiment of the present disclosure includes a core body 13 and a header 11. The core body 13 includes a plurality of axial passages 3 extending along the axial direction. The header 11 is adjacent to at least one end portion of the core body 13 in the axial direction and has a header passage 6 communicating with the plurality of axial passages 3. The header passage 6 includes at least one radial passage 61 extending along the radial direction. The header passage 6 includes a plurality of circumferential passages 66 branched from any radial passage 61 and communicating with one or more axial passages 3, respectively. The plurality of circumferential passages 66 includes a first circumferential passage 661. The plurality of circumferential passages 66 includes a second circumferential passage 662 disposed radially inward of the first circumferential passage 661 and arranged in the circumferential direction over the total angular range θt larger than that of the first circumferential passage 661.

According to the above configuration (18), since the header passage 6 includes the at least one radial passage 61 and the plurality of circumferential passages 66 branched from any radial passage 61 and communicating with one or more axial passages 3, the header 11 can be relatively downsized.

If the header passage 6 merely includes at least one radial passage 61 and a plurality of circumferential passages 66 branched from any radial passage 661 and communicating with one or more axial passages 3, even with the same total angle range θt, due to the difference in radial position, the first passage length L1 of the first circumferential passage 661 is longer than the second passage length L2 of the second circumferential passage 662. Thus, if the passage width (width in the radial direction) is the same, the pressure loss is larger in the first circumferential passage 661 than the second circumferential passage 662, making it difficult for the first fluid to flow.

In this regard, according to the above configuration (18), since the total angular range θt of the first circumferential passage 661 is smaller than the total angular range θt of the second circumferential passage 662, as compared to the case where the total angle range θt is the same between the first circumferential passage 661 and the second circumferential passage 662, the difference between the first passage length L1 and the second passage length L2 can be suppressed. This prevents the pressure loss of the first circumferential passage 661 from becoming larger than that of the second circumferential passage 662, thus suppressing the difference in the flow velocity between the first circumferential passage 661 and the second circumferential passage 662. As a result, the difference between the flow rate of the first fluid in the axial passage 3 connected to the first circumferential passage 661 and the flow rate of the first fluid in the axial passage 3 connected to the second circumferential passage 662 can be suppressed, and the heat exchange efficiency of the heat exchanger core 10 can be improved.

(19) In some embodiments, in the above configuration (18), the at least one radial passage 61 includes a first radial passage 601 and a second radial passage 602. The first radial passage 601 communicates with the first circumferential passage 661. The second radial passage 602 is disposed over the radial range occupied by the first radial passage 601 and a range radially inward of the radial range and communicates with the second circumferential passage 662. In the circumferential direction, the second circumferential passage 662 extends from the second radial passage 602 past the first radial passage 601 to the opposite side of the first radial passage 601.

According to the above configuration (19), the total angular range θt of the second circumferential passage 662 can be made larger than that of the first circumferential passage 661 without complicating the shape of the first circumferential passage 661 and the second circumferential passage 662, thus suppressing the difference in the flow velocity between the first circumferential passage 661 and the second circumferential passage 662.

(20) In some embodiments, in the above configuration (19), the first radial passage 601 does not communicate with the second circumferential passage 662, and the second radial passage 602 does not communicate with the first circumferential passage 661.

According to the above configuration (20), when the first fluid flows from the first radial passage 601 to the first circumferential passage 661, all the first fluid from the first radial passage 601 can be supplied to the first circumferential passage 661. Therefore, an insufficient supply amount of the first fluid to the first circumferential passage 661 can be suppressed, and a decrease in the heat exchange efficiency can be suppressed.

Similarly, when the first fluid flows from the second radial passage 602 to the second circumferential passage 662, all the first fluid from the second radial passage 602 can be supplied to the second circumferential passage 662. Therefore, an insufficient supply amount of the first fluid to the second circumferential passage 662 can be suppressed, and a decrease in the heat exchange efficiency can be suppressed.

Further, when the first fluid flows from the first circumferential passage 661 to the first radial passage 601, since the first fluid from the second circumferential passage 662 does not flow into the first radial passage 601, it is possible to prevent the flow rate of the first fluid flowing through the first radial passage 601 from increasing due to the first fluid from the second circumferential passage 662. As a result, it is possible to suppress an increase in the pressure loss in the first radial passage 601 and suppress a decrease in the flow rate in the first circumferential passage 661 to suppress a decrease in the heat exchange efficiency.

Similarly, when the first fluid flows from the second circumferential passage 662 to the second radial passage 602, since the first fluid from the first circumferential passage 661 does not flow into the second radial passage 602, it is possible to prevent the flow rate of the first fluid flowing through the second radial passage 602 from increasing due to the first fluid from the first circumferential passage 661. As a result, it is possible to suppress an increase in the pressure loss in the second radial passage 602 and suppress a decrease in the flow rate in the second circumferential passage 662 to suppress a decrease in the heat exchange efficiency.

(21) In some embodiments, in the above configuration (19) or (20), the first radial passage 601 includes one or more first radial passages 601. The second radial passage 602 includes a plurality of second radial passages 602 arranged along the circumferential direction. The number of first radial passages 601 is larger than the number of second radial passages 602.

According to the above configuration (21), as compared to the case where the number of first radial passages 601 is smaller than the number of second radial passages 602, the distance between two first radial passages 601 adjacent to each other in the circumferential direction can be reduced along the circumferential direction, so that the first passage length L1 of the first circumferential passage 661 can be suppressed. As a result, the difference between the first passage length L1 of the first circumferential passage 661 and the second passage length L2 of the second circumferential passage 662 can be suppressed. This suppresses the difference in pressure loss between the second circumferential passage 662 and the first circumferential passage 661, thus suppressing the difference in the flow velocity between the first circumferential passage 661 and the second circumferential passage 662.

(22) In some embodiments, in any one of the above configurations (19) to (21), the first radial passage 601 includes two or more first radial passages 601 arranged along the circumferential direction at an even pitch. The second radial passage 602 includes two or more second radial passages 602 arranged along the circumferential direction at an even pitch.

According to the above configuration (22), as compared to the case where the first radial passages 601 are arranged at an uneven pitch, it is possible to suppress the difference in the passage length of the circumferential passage 66 due to the connected first radial passage 601 and prevent the flow rate from varying with the individual circumferential passage 66. Similarly, as compared to the case where the second radial passages 602 are arranged at an uneven pitch, it is possible to suppress the difference in the passage length of the circumferential passage 66 due to the connected second radial passage 602 and prevent the flow rate from varying with the individual circumferential passage 66. Thus, it is possible to suppress a decrease in the heat exchange efficiency.

Further, the arrangement at an even pitch allows for efficient arrangement of the radial passages 61 and suppresses the number of radial passages 61. As a result, the proportion of the region occupied by the radial passages 61 in the cross-section (second transverse cross-section C2) of the header 11 when viewed from the axial direction can be decreased, and the proportion of the region occupied by the circumferential passages 66 can be increased.

(23) In some embodiments, in the above configuration (18), the first circumferential passage 661 and the second circumferential passage 662 communicate with the same radial passage 61. The second circumferential passage 662 has a larger number of folds than the first circumferential passage 661.

According to the above configuration (23), as compared to the case where the first circumferential passage 661 and the second circumferential passage 662 communicate with different radial passages 61, the number of radial passages 61 can be suppressed. As a result, the proportion of the region occupied by the radial passages 61 in the cross-section (second transverse cross-section C2) of the header 11 when viewed from the axial direction can be decreased, and the proportion of the region occupied by the circumferential passages 66 can be increased.

Further, when the second circumferential passage 662 has a larger number of folds than the first circumferential passage 661, the total angular range θt of the second circumferential passage 662 can be increased to secure the second passage length L2. Thus, it is possible to suppress the difference in the flow velocity between the first circumferential passage 661 and the second circumferential passage 662.

(24) In some embodiments, in the above configuration (23), the radial passage 61 includes two or more radial passages 61 spaced apart from each other in the circumferential direction. Between two radial passages 61 adjacent in the circumferential direction, a second partition wall W5 is formed, which separates in the circumferential direction a plurality of circumferential passages 66 branched from one of the two radial passages 61 and a plurality of circumferential passages 66 branched from the other of the two radial passages 61.

According to the above configuration (24), the circumferential range in which the circumferential passages 66 connected to one radial passage 61 are arranged and the circumferential range in which the circumferential passages 66 connected to the other radial passage 61 are arranged can be defined by the second partition wall W5.

(25) In some embodiments, in the above configuration (23) or (24), the radial passage 61 includes a plurality of radial passages 61 arranged along the circumferential direction at an even pitch.

According to the above configuration (25), as compared to the case where the radial passages 61 are arranged at an uneven pitch, it is possible to suppress the difference in the passage length Lc of the circumferential passage 66 due to the connected radial passage 61 and prevent the flow rate from varying with the individual circumferential passage 66.

Further, the arrangement at an even pitch allows for efficient arrangement of the radial passages 61 and suppresses the number of radial passages 61. As a result, the proportion of the region occupied by the radial passages 61 in the cross-section (second transverse cross-section C2) of the header 11 when viewed from the axial direction can be decreased, and the proportion of the region occupied by the circumferential passages 66 can be increased.

(26) In some embodiments, in any one of the above configurations (18) to (25), the radial passage 61 is connected to the circumferential passages 66 that are disposed on one side and the other side of the radial passage 61 in the circumferential direction.

According to the above configuration (26), as compared to the case where the radial passage 61 is connected to either one of the circumferential passages 66 that are disposed on one side and the other side of the radial passage 61 in the circumferential direction, the number of radial passages 61 can be suppressed. As a result, the proportion of the region occupied by the radial passages 61 in the cross-section of the header 11 when viewed from the axial direction can be decreased, and the proportion of the region occupied by the circumferential passages 66 can be increased.

(27) In some embodiments, in any one of the above configurations (18) to (26), the plurality of axial passages 3 are arranged in an annular shape when viewed from the axial direction.

According to the above configuration (27), the stress acting due to the pressure of the fluid or the like can be uniformly distributed throughout the heat exchanger core 10.

(28) In some embodiments, in any one of the above configurations (18) to (27), the at least one radial passage 61 includes two or more radial passages 61. The two or more radial passages 61 have the same flow passage cross-sectional area.

According to the above configuration (28), as compared to the case where the two or more radial passages 61 have different flow passage cross-sectional areas, the difference in the flow rate of the fluid in the two or more radial passages 61 can be reduced, so that a decrease in the heat exchange efficiency can be suppressed.

(29) In some embodiments, in any one of the above configurations (18) to (28), each of the axial passages 3 is divided into a plurality of sections S in the circumferential direction.

According to the above configuration (29), it is possible to improve the heat transfer efficiency with the walls which divide the axial passage 3 into the sections. The walls improve the stiffness and strength of the heat exchanger core 10, especially in the radial direction.

(30) In some embodiments, in the above configuration (29), the plurality of sections S of the axial passages 3 have a uniform flow passage diameter.

According to the above configuration (30), the flow state such as friction loss is made uniform among all the sections, so that the heat transfer coefficient is made uniform among all the sections, and the stress is uniformly dispersed in the entire in-plane direction of the transverse cross-section of the heat exchanger core 10, thus equalizing the stress.

(31) A heat exchanger 1 according to at least one embodiment of the present disclosure is provided with: the heat exchanger core 10 having any one of the above configurations (18) to (30); and a casing 20 accommodating the heat exchanger core 10.

According to the above configuration (31), the heat exchanger 1 can be relatively downsized, and the heat exchange efficiency can be improved.

(32) A method of producing a heat exchanger core according to at least one embodiment of the present disclosure is to produce a heat exchanger core 10, including a core body formation step S1 of forming a core body 13 including a plurality of axial passages 3 extending along the axial direction by additive manufacturing, and a header formation step S3 of forming a header 11 adjacent to at least one end portion of the core body 13 in the axial direction and having a header passage 6 communicating with the plurality of axial passages 3 by additive manufacturing.

The header formation step S3 includes forming the header passage 6 so as to include at least one radial passage 61 extending along the radial direction, and a plurality of circumferential passages 66 branched from any radial passage 61 and communicating with one or more axial passages 3, respectively. The header formation step S3 includes forming the plurality of circumferential passages 66 so as to include a first circumferential passage 661, and a second circumferential passage 662 disposed radially inward of the first circumferential passage 661 and arranged in the circumferential direction over the total angular range θt larger than that of the first circumferential passage 661.

According to the above method (32), since the heat exchanger core 10 can be integrally formed by additive manufacturing, it is not necessary to assemble components or seal the components with a gasket. Thus, it is possible to significantly reduce the maintenance work.

REFERENCE SIGNS LIST

1 Heat exchanger
3 Axial passage
6 Header passage
10 Heat exchanger core
11 Header
11A First header (Header)
11B Second header (Header)
13 Core body
20 Casing
61 Radial passage
63 Opening
66 Circumferential passage
101 First passage
102 Second passage
601 First radial passage
602 Second radial passage
661 First circumferential passage
662 Second circumferential passage
W0 Side wall
W3 Crossing wall
W5 Partition wall (Second partition wall)

The invention claimed is:

1. A heat exchanger core, comprising:
a core body including a plurality of axial passages extending along an axial direction; and a header adjacent to at least one end portion of the core body in the axial direction and having a header passage communicating with the plurality of axial passages,
wherein the header passage includes:
at least one radial passage extending along a radial direction, and a plurality of circumferential passages branched from each radial passage and communicating with one or more of the axial passages, respectively,
wherein a flow passage area of each radial passage is smaller in a second position than in a first position, where the second position is inward of the first position in the radial direction,
wherein at least one opening is formed by the at least one radial passage on an outer peripheral surface of the heat exchanger core in the header, and
wherein a total area of opening areas of each opening is equal to or smaller than a total area of areas of the plurality of circumferential passages when viewed from the axial direction.

2. The heat exchanger core according to claim 1,
wherein at least one opening is formed by the at least one radial passage on an outer peripheral surface of the heat exchanger core in the header, and
wherein an opening dimension along the axial direction of each opening is one or more times an opening dimension along a circumferential direction of each opening.

3. A heat exchanger core, comprising:
a core body including a plurality of axial passages extending along an axial direction; and a header adjacent to at least one end portion of the core body in the axial direction and having a header passage communicating with the plurality of axial passages,
wherein the header passage includes:
at least one radial passage extending along a radial direction, and
a plurality of circumferential passages branched from each radial passage and communicating with one or more of the axial passages, respectively,
wherein a flow passage area of each radial passage is smaller in a second position than in a first position, where the second position is inward of the first position in the radial direction,
wherein the at least one radial passage is formed such that at least one of two end portions of the radial passage along the axial direction has a circumferential dimension that decreases outward along the axial direction.

4. A heat exchanger core, comprising:
a core body including a plurality of axial passages extending along an axial direction; and a header adjacent to at least one end portion of the core body in the axial direction and having a header passage communicating with the plurality of axial passages, wherein the header passage includes:
- at least one radial passage extending along a radial direction, and
- a plurality of circumferential passages branched from each radial passage and communicating with one or more of the axial passages, respectively, wherein a flow passage area of each radial passage is smaller in a second position than in a first position, where the second position is inward of the first position in the radial direction, wherein the header includes a first header adjacent to the one end portion of the core body in the axial direction and a second header adjacent to another end portion of the core body in the axial direction, and wherein an area increase rate of the flow passage area of the at least one radial passage increasing from an inner side to an outer side in the radial direction differs between the at least one radial passage in the first header and the at least one radial passage in the second header.

5. The heat exchanger core according to claim 3,
wherein at least one opening is formed by the at least one radial passage on an outer peripheral surface of the heat exchanger core in the header, and
wherein an opening dimension along the axial direction of each opening is one or more times an opening dimension along a circumferential direction of each opening.

6. The heat exchanger core according to claim 5,
wherein a total area of opening areas of each opening is equal to or smaller than a total area of areas of the plurality of circumferential passage when viewed from the axial direction.

7. A heat exchanger, comprising:
the heat exchanger core according to claim 1; and
a casing accommodating the heat exchanger core.

* * * * *